(12) United States Patent
Kim et al.

(10) Patent No.: US 8,330,420 B2
(45) Date of Patent: Dec. 11, 2012

(54) DYNAMICALLY RECONFIGURABLE FRAMEWORK FOR A LARGE-SCALE BATTERY SYSTEM

(75) Inventors: Hahnsang Kim, Ann Arbor, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 360 days.

(21) Appl. No.: 12/758,449

(22) Filed: Apr. 12, 2010

(65) Prior Publication Data
US 2010/0261048 A1    Oct. 14, 2010

Related U.S. Application Data

(63) Continuation-in-part of application No. 12/757,293, filed on Apr. 9, 2010.

(60) Provisional application No. 61/168,472, filed on Apr. 10, 2009.

(51) Int. Cl.
*H02J 7/00* (2006.01)
(52) U.S. Cl. .......................... 320/122; 320/117; 320/120
(58) Field of Classification Search .......... 320/116–122, 320/126
See application file for complete search history.

(56) References Cited

U.S. PATENT DOCUMENTS

| | | | |
|---|---|---|---|
| 4,175,249 A | | 11/1979 | Gruber |
| 4,894,764 A | | 1/1990 | Meyer et al. |
| 5,898,291 A | * | 4/1999 | Hall ............................... 320/121 |
| 7,075,194 B2 | * | 7/2006 | Weidenheimer et al. ........ 307/71 |
| 7,535,199 B2 | * | 5/2009 | Kimura et al. ................. 320/121 |
| 7,557,538 B2 | * | 7/2009 | Yau et al. ....................... 320/116 |
| 2004/0101744 A1 | | 5/2004 | Suzuki |
| 2005/0052154 A1 | | 3/2005 | Kavounas |
| 2005/0242776 A1 | | 11/2005 | Emori et al. |
| 2006/0092583 A1 | * | 5/2006 | Alahmad et al. ................ 361/15 |
| 2006/0164038 A1 | | 7/2006 | Demers et al. |
| 2009/0085553 A1 | | 4/2009 | Kumar et al. |
| 2010/0261043 A1 | * | 10/2010 | Kim et al. ........................ 429/61 |

OTHER PUBLICATIONS

S. Ci et al "A Novel Design of Adaptive Reconfigurable Multicell Battery for Power-Aware Embedded Networked Sensing Systems" IEEE Globecom 2007.
International Search Report and Written Opinion dated Nov. 29, 2011 from corresponding International Patent Application No. PCT/US2011/031535.

* cited by examiner

*Primary Examiner* — Richard V Muralidar
(74) *Attorney, Agent, or Firm* — Harness, Dickey & Pierce, P.L.C.

(57) ABSTRACT

A dynamically reconfigurable framework is provided for a large-scale battery system. The framework is comprised of a plurality of battery circuits arranged adjacent to each other to form a battery-cell array that is coupled to an application load. A given battery circuit includes: a battery cell with an input terminal and an output terminal; a first switch connected between the load and an input terminal of the battery cell; a second switch is connected between an input terminal of the battery cell and an output terminal of a battery cell in an immediately adjacent battery circuit; and a third switch connected between the output terminal of the battery cell and the output terminal of the battery cell in the adjacent battery circuit. The battery-cell array also includes a local controller that selectively controls the switches in the plurality of battery circuits.

19 Claims, 10 Drawing Sheets

(a) Mean Reliability

DYNAMICALLY RECONFIGURABLE FRAMEWORK FOR A LARGE-SCALE BATTERY SYSTEM

CROSS-REFERENCE TO RELATED APPLICATIONS

This application is a continuation-in-part of U.S. patent application Ser. No. 12/757,293 filed on Apr. 9, 2010 which claims the benefit of U.S. Provisional Application No. 61/168,472 filed on Apr. 10, 2009. The entire disclosure of the above applications are incorporated herein by reference.

FIELD

The present disclosure relates to battery management and, more particularly, to a dynamically reconfigurable framework for a large-scale battery system.

BACKGROUND

Demand for electric vehicles with hybrid drive has soared worldwide due mainly to a recent sharp increase in fuel prices. Conventional battery management systems for electric vehicles (EVs), however, are designed in an ad hoc way, causing the supply of electric vehicles to fall behind the market demand.

Cost-effective electric vehicles require not only development of high energy density battery cells, but also efficient management of large-scale battery packs, each consisting of a large number of battery cells. In particular, a battery management system (BMS) that monitors and controls battery cells in a pack, must cope with heterogeneous batterycell characteristics. That is, even if characteristics of all battery cells in a battery pack are initially identical, as they are charged and discharged repeatedly, each cell will exhibit different characteristics. A weak cell—hat is (charged and/or) discharged faster than others—is likely to be (over-charged and/or) deep-discharged, i.e., the battery cell continues to be discharged even when its terminal voltage falls below a certain threshold called a cutoff voltage. This weak battery cell can eventually become faulty, and will, if not managed properly, cause the whole pack to be dysfunctional.

A battery management system should be able to cope with weak/faulty cells in such a way that faulty cells are bypassed to keep the pack operational. Bypassing certain cells inside a pack, however, requires switches by which the connection arrangement of battery cells can be changed. Switches are placed around battery cells, regulating the battery supply power. Furthermore, a reconfigurable battery system may offer a way to alter battery connectivity and dynamically adjust supply power to meet application demands. All of these systems require careful system specification, cost-effective incorporation and control of system components, such as switches and battery cells.

There are two main challenges in developing a battery management architecture. First, there is a tradeoff between the minimum number of hardware components to use and maximum reconfigurability in a BMS. Key components therein are switches that allow a battery-cell array to be reconfigurable. The more switches around cells, the more reconfigurable the array becomes, but the costlier. Also, individual components affect directly system reliability. System reliability should be assessed based on the reliability of components and their connections. At the same time, since the cost is the major consideration in realizing a reconfigurable architecture, the components count should be minimized. Second, to maximize both system reconfigurability and reliability, a reconfigurable architecture should be specified with respect to software/hardware components and their inter-relationship. An application (software) may require various battery (hardware) conditions from a BMS. Also, a BMS may request subsystem/local BMSs, if any, for the information on the status of individual battery cells in the case of modular management architecture. Upon receipt of this request, individual local BMSs periodically monitor their battery-cell arrays and reconfigure them, if necessary, in accordance with individual cell characteristics. This interaction between local BMSs also depends upon the underlying hardware system design. A well-designed, combined hardware-software battery management architecture will provide high reliability, cost-effectiveness, and scalability.

This section provides background information related to the present disclosure which is not necessarily prior art.

SUMMARY

A dynamically reconfigurable framework is provided for a large-scale battery system. The framework is comprised of a plurality of battery circuits arranged adjacent to each other to form a battery-cell array that is coupled to an application load. A given battery circuit includes: a battery cell with an input terminal and an output terminal; a first switch connected between the load and an input terminal of the battery cell; a second switch is connected between an input terminal of the battery cell and an output terminal of a battery cell in an immediately adjacent battery circuit; and a third switch connected between the output terminal of the battery cell and the output terminal of the battery cell in the adjacent battery circuit. The battery-cell array also includes a local controller that selectively controls the switches in the plurality of battery circuits.

In another aspect of this disclosure, the framework is comprised a plurality of battery cell arrays adjoined to each other, where each of the battery cell arrays defines an input node and an output node and includes a plurality of battery cells therein. A given battery cell array includes a first array-level switch coupled between a load and the input node for the given battery-cell array, a second array-level switch coupled between the input node for the given battery-cell array and an output node of an adjoining battery-cell array, and a third array-level switch coupled between the output node of the given battery-cell array and the output node of the adjoining battery cell array. A global controller selectively controls the first, second and third array-level switches of the given battery cell array.

Further areas of applicability will become apparent from the description provided herein. The description and specific examples in this summary are intended for purposes of illustration only and are not intended to limit the scope of the present disclosure.

DRAWINGS

Figure 1:
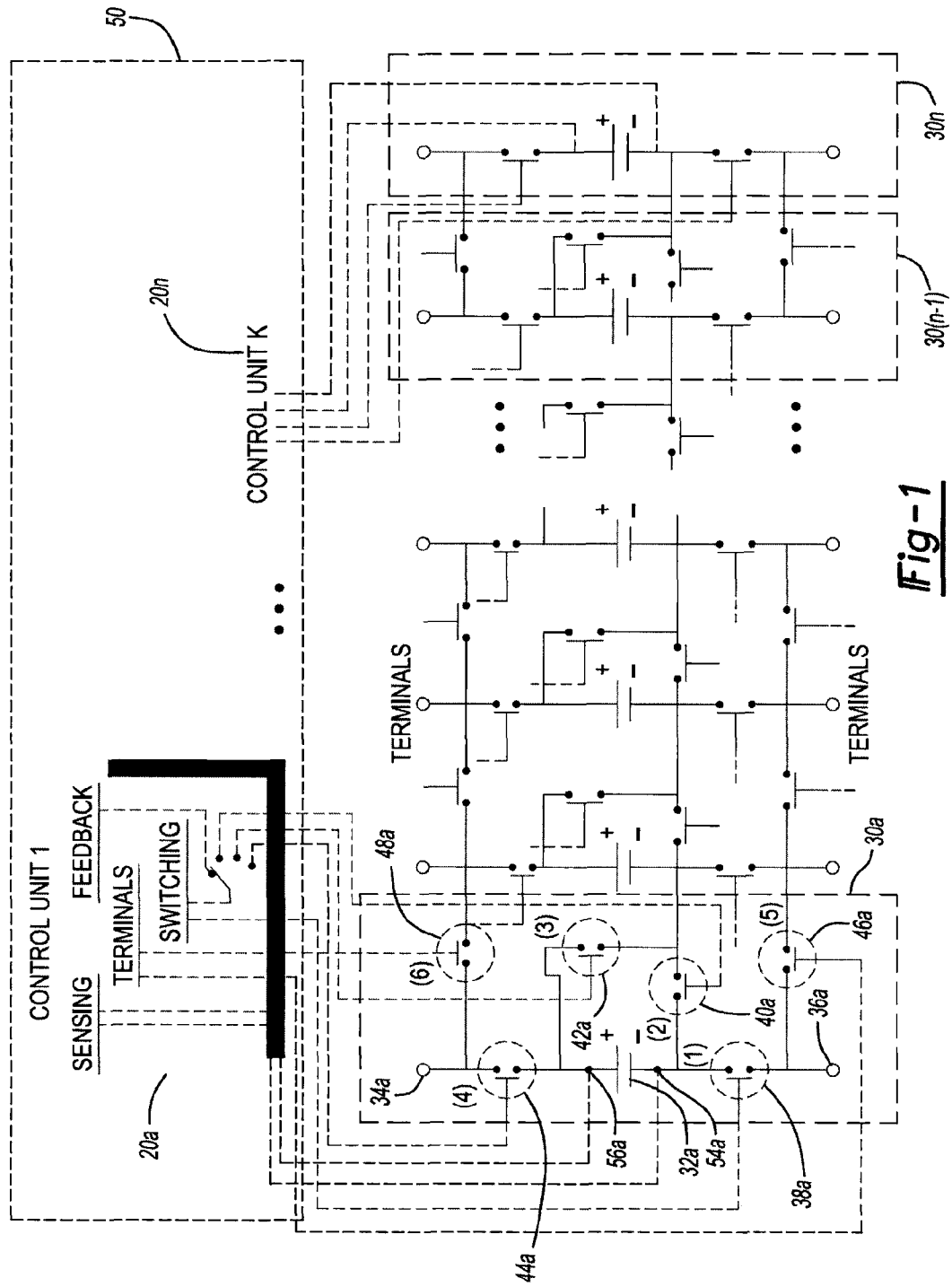
FIG. 1 is a diagram depicting an exemplary arrangement for a reconfigurable battery system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

A rechargeable battery cell may be any cell capable of converting chemical energy to electrical energy, and vice-versa. This is typically accomplished by electrochemical oxidation and reduction reactions. These reactions involve the exchange of electrons through the load between electro-active species in two electrodes inside the battery cell, generating a flow of electric current. Ideally, the total number of current units, or Coulomb, from a battery cell will always be the same throughout its entire life cycle. In reality, however, the characteristics of a battery cell are nowhere close to being ideal due to the uncertainty of reaction kinetics and diffusion processes and/or active material dissolution in the battery cell over time. Exemplary battery cells may include nickel metal hydride (NiMH), lithium ion, nickel cadmium (NiCd), lithium iron phosphate, lithium sulfur, lithium-titanate, nickel hydrogen, nickel-metal hydride, nickel-iron, sodium sulfur, vanadium redox, and rechargeable alkaline. The architecture described below may be applied to these as well as other types of rechargeable battery cells.

Rechargeable battery cells exhibit different characteristics in practice. For instance, the battery terminal voltage is not constant during its discharge; voltage drops non-linearly with a discharge rate. The higher the discharge rate, the steeper the voltage drop. For this reason, a DC-DC converter may be used to shift and stabilize the supply voltage. Second, battery capacity varies with the discharge rate; the higher the discharge rate, the lower the battery capacity. Third, batteries have limited charge recovery effects at a high discharge rate. A high load current for a short period of time causes a higher concentration gradient among electro-active species, making the unused charge unavailable due to the lag between reaction and diffusion rates. Thus, when the battery is allowed to rest for some time at a low (or zero) charge rate, the voltage that dropped temporarily goes back up. Last, temperature also affects internal resistance and full charge capacity. The lower the temperature, the higher the internal resistance, thereby reducing full charge capacity. On the other hand, high temperature leads to self-discharge, reducing the actual capacity to be delivered. In addition to these characteristics, some batteries, e.g., NiCd batteries, are known to have memory effect, while Lithium-ion batteries do not.

Apart from temporary changes in battery capacity noted above, batteries may lose their capacity to some extent due to unwanted side reactions including electrolyte decomposition, active material dissolution, and passive film formation, thereby increasing internal resistance and ultimately causing a battery-cell failure. Several possible failure modes exist, making the battery cell behavior difficult to predict. First, an open circuit can be a fail-safe mode for other battery cells in the series chain including an open-circuited battery cell, because the open circuit limits further damage to the other battery cells. However, this failure mode may not be useful to the applications because all the battery cells in the series chain can become open-circuited and unusable. Second, a short circuit that has an abnormal low electrical resistance incurs almost no voltage drop, so that the rest of the battery cells in the chain could be slightly overloaded while the whole battery pack (i.e., a set of the battery cells) remains functional. Last, a possible explosion is avoided via a protection circuit that detects and stops an extremely high current.

FIG. 1 depicts an exemplary arrangement for a reconfigurable battery system 10. The reconfigurable battery system 10 is comprised generally of a plurality of battery circuits 30a-30n arranged adjacent to or adjoined to each other. Each battery circuit 30a-30n has an associated control module 20a-20n. In an exemplary embodiment, the control modules 20a-20n are implemented by a controller 50 although it is envisioned that the functions supported by the control modules 20a-20n (or portions thereof) may be partitioned amongst multiple controllers. As used herein, the term module may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. It is should be understood that software or firmware programs are implemented as computer executable instructions residing in a computer memory and executed by a computer processor.

The battery circuits 30a-30n are comprised of an input terminal 36a, an output terminal 34a, and a battery cell 32a interposed between the input terminal 36a and the output terminal 34a. The design of the dynamic reconfiguration framework is guided by a principle: one should be able to bypass any battery cell. In addition, as few switches as possible should be placed around a given battery cell to minimize cost and improve reliability. In the exemplary embodiment, each battery circuit further include four switches: an input switch 38a (also referred to as $S_I$) connected between the input terminal 36a and the negative terminal of the battery cell 32a; a parallel switch 44a (also referred to as $S_P$) connected between the output terminal 34a and the positive terminal of the battery cell; a bypass switch 40a (also referred to as $S_B$) connected between the negative terminal of the battery cell and a negative terminal of an adjacent battery circuit; and a series switch 42a (also referred to as $S_S$) connected between the positive terminal of the battery cell 32a and the negative terminal of the adjacent battery circuit. Battery circuits 30a-

30n are interconnected by input terminal switches 46a-46n and output terminal switches 48a-48n (also referred to as $S_{IT}$ and $S_{OT}$, respectively) which to allow the battery system to provide multiple terminals as further described below. While reference is made to a particular switch arrangement, other switch arrangements are within the broader aspects of this disclosure.

Control units 20a-20n configure the switches in the plurality of battery circuits to form different circuit arrangements. For example, battery cells may be configured in a series arrangement by setting the switches in a given battery circuit 30b as follows: input switch 38b is set off; series switch 42b is set on; bypass switch 40b is set off; and parallel switch 44b is set off, where on is a closed circuit across the switch and off is an open circuit across the switch. When a plurality of cells are arranged in series, a cell 32b can be bypassed by setting the switches as follows: input switch 38b is set off; series switch 42b is set off; bypass switch 40b is set on; and parallel switch 44b is set off. It is readily understood that switches in battery circuits on either end of the series string may be configured differently to place the respectively cell in the series string or be bypassed.

To configure battery cells in parallel with each other, switches in a given battery circuit 30b are configured as follows: input switch 38b is set on; series switch 42b is set off; bypass switch 40b is set off; and parallel switch 44b is set on. Likewise, it is understood that switches in battery circuits on either end of the parallel grouping may be configured differently to place the respectively cell in parallel with the remaining cells. When a plurality of cells are arranged in parallel, a cell can be bypassed by setting all of the switches in the given battery circuit to off.

The architecture of the dynamic reconfigurable battery system 10 can be represented as $\Psi=(E,F,S,D)$, where E is an array of sensors, $\{E_1, \ldots, E_i, \ldots, E_k\}$ each of which reads the voltage and the current of a corresponding battery cell. F denotes an array of feedback switches, $\{F_1, \ldots, F_i, \ldots, F_k\}$, that the controller maintains to determine which cell to be bypassed. When a battery-cell failure in device i is detected, ($F_i$, On) is turned. S denotes an array of the switches, $\{S_1, \ldots, S_i, \ldots, S_k\}$, where $S_i$ is composed of $S_{i,T}$, $S_{i,O}$, $S_{i,B}$, $S_{i,S}$, $S_{i,P}$, $S_{i,IT}$, and $S_{i,OT}$. D is a set of battery devices, $\{D_1, \ldots, D_i, \ldots, D_k\}$. The connectivity of these devices is thought of as an $n_s \times n_p$ matrix:

$$\begin{pmatrix} D_{1,1} & \ldots & D_{1,n_p} \\ \vdots & \ddots & \vdots \\ D_{n,n1} & \ldots & D_{n,n_p} \end{pmatrix} \quad (1)$$

where $n_s$ is the number of battery cells connected in a series chain and $n_p$ is the number of the series chains connected in parallel. The terms $V_d$ and $V_a$ denote the voltage demand and the average voltage of battery cells (or a set of battery packs), respectively. It is understood that the voltage demand is dictated by the application. Similarly, $f_N$ is defined as:

$$f_N = \sum_{i=1}^{k} I(F_i)' \quad (2)$$

where $(F_i)$ is an indication function, i.e., if $(F_i, \text{Off})$ holds, then the function returns 1, else it returns 0.

During operation, the control unit for a given battery circuit monitors an operational state of the battery cell in the battery circuit and controls switches in the battery circuit in accordance with the operational state. In the exemplary embodiment, control unit 20a-20n communicates with two sensors 54a-54n and 56a-56n to monitor the battery condition. For example, control unit 20a-20n monitors changes in the state of charge (SOC) and voltage of its battery cells via sensing devices 54a-54n and 56a-56n. The SOC of a battery cell may be estimated by measuring and integrating the current flowing into and out of battery cell 32a-32n over time, called a Coulomb count. In practice, voltage and temperature may also be figured in as battery variables. Thus, function $f_{V,T}$ (SOC, ∂Idt), that is based on the content of the coulomb count returns SOC. On the other hand, in general, direct voltage measurement is not accurate enough to be used as an indicator because of its dependency on the discharge rate and temperature. Voltage may be estimated by applying a Kalman filter in some embodiments. Alternatively, one may assume that an integrated recursive function, $f_{V,I,T}$(SOC, ∂Idt), is given and returns [V, SOC]. Other techniques for determining state of charge and/or voltage of battery cells are also within the scope of this disclosure. It is readily understood that different types of sensors may be used to monitor battery conditions.

At periodic monitoring intervals ($\Delta t$,), the controller 50 checks the SOC of each battery cell via the corresponding control unit 20a-20n and triggers a rotation event if $$\frac{\min(SOC_1, \ldots, SOC_k)}{\max(SOC_1, \ldots, SOC_k)} < \delta \quad (3)$$

holds, where $\delta$ denotes a threshold that bounds the maximum variation of SOCs. The larger the $\delta$, the more the battery cells become unbalanced. Furthermore, the variation needs to be adjusted with $\delta$, in conjunction with $\Delta t$, because the larger the $\Delta t$, the larger the variation. In particular, $\Delta t$ is inversely proportional to the discharge rate. A rotation event is an adjustment in the battery pack where health battery cells are rotated with other healthy battery cells for the purpose of keeping the cells healthy.

For discussion purposes, a faulty cell may be regarded as a battery cell that can be charged as low as 80% nominal capacity and/or that has voltage as low as the cut-off voltage in a fully charged state. Thus, when battery cell i is determined faulty ($F_i$, On) is turned in control unit i. Other criteria for determining a faulty cell are also contemplated.

At each monitoring interval ($\Delta t$,), the controller 50 also checks the average voltage and triggers a reconfiguration event unless $$V_d \leq V_a * n_s \langle V_d + \alpha \quad (4)$$

holds, where $\alpha$ specifies an upper bounds of voltage unbalancing. It can be observed that $\alpha$ is tuned based on the granularity in supply voltage. The reconfiguration event causes the controller to change the topology of the battery circuits. A reconfiguration event typically occurs when a battery cell is determined to be faulty. A reconfiguration event may also occur when additional applications require a voltage supply, thereby requiring a multiple terminal configuration. Other types of triggering reconfiguration events are also contemplated by this disclosure.

In the event of a battery cell failure or another triggering reconfiguration event, a semantic bypassing mechanism configures battery connectivity. In general, the semantic bypassing mechanism implements policies for supplying a wide range of voltages while abiding by voltage balancing across the parallel groups of the series chains. In an exemplary embodiment, two policies are implemented by the semantic bypassing mechanism although other policies are contemplated by this disclosure. The semantic bypass mechanism is implemented by the controller.

First, a constant-voltage-keeping policy is specified to keep the supply voltage as constant over the battery lifetime as possible in spite of the battery-cell failure. To this end, the series chain containing the faulty battery cell is bypassed. However, it is possible that the voltages of both used and unused healthy battery cells in the series chain may drift apart over time, resulting in unbalanced voltages between the battery cells within the series chain. For this reason, a rotation event is triggered during the monitoring, reconfiguring the battery-cell connectivity. For connectivity reconfiguration, battery cells at the lowest level of their SOC are singled out first.

Figure 2:
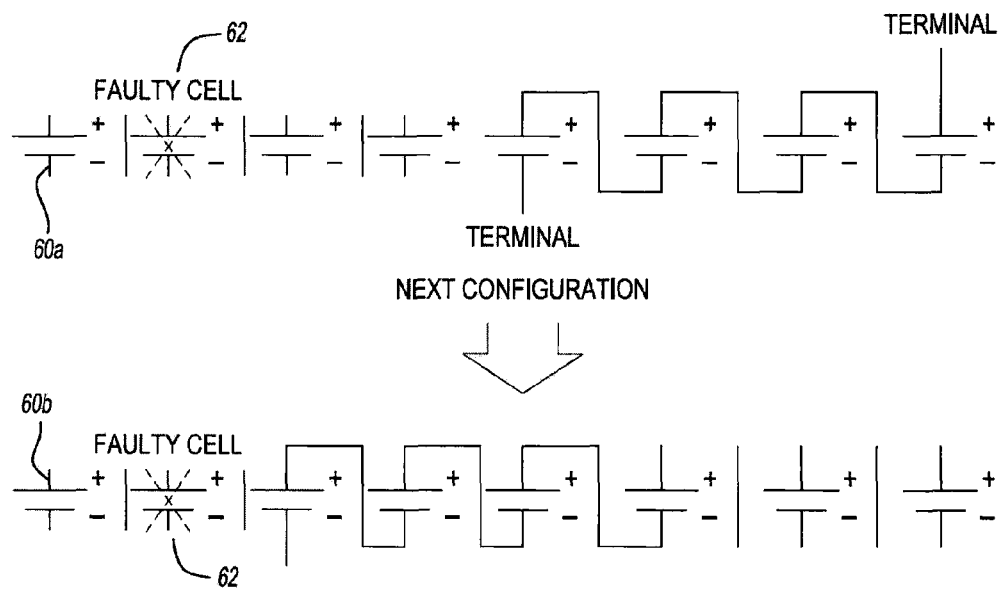
FIG. 2 is a diagram illustrating reconfiguration of battery cells under a constant-voltage policy.

FIG. 2 illustrates the reconfiguration of battery cells in a series chain under the constant-voltage-keeping policy. In FIG. 2, two configurations 60a and 60b are depicted. In a first configuration 60a, the last four battery cells are connected in series. In a second configuration 60b, controller 52 has connected the middle four battery cells in series in accordance with the constant voltage keeping policy. As can be seen, the healthy battery cells are being rotated, thereby keeping the voltage constant. As can be observed in the figure, the faulty cell 62 is excluded in both configurations.

To implement a constant-voltage keeping policy, controller 52 must determine how many battery cells should be bypassed. The number of battery cells to be bypassed is calculated as follows. Given $V_d$, $n_s$ is first calculated by $$\left\lceil \frac{V_d}{V_a} \right\rceil;$$

use of $V_a$ offsets the nonlinear voltage drop during their lifetime. $n_p$ is then derived from $$\left\lfloor \frac{f_N(\Psi)}{n_s} \right\rfloor,$$

where $f_N(\Psi)$ indicates/returns the total number of battery cells available to use. This equation leads to $(f_N(\Psi)-n_s \cdot n_p)$ healthy battery cells to be bypassed. This procedure repeats at periodic intervals ($\Delta t$) or upon initiation of a reconfiguration event.

Figure 3:
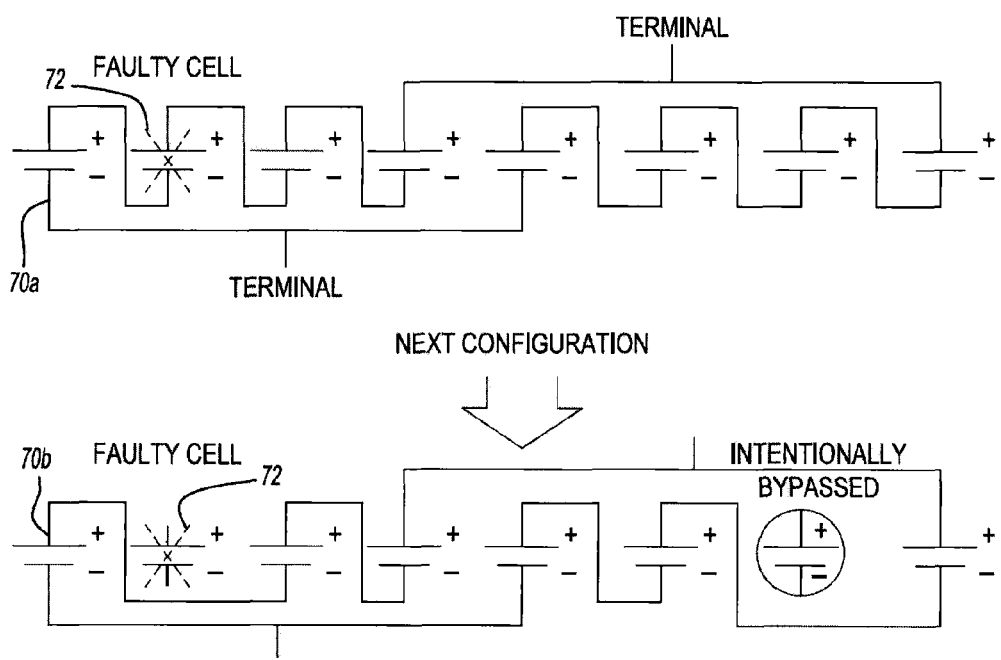
FIG. 3 is a diagram illustrating reconfiguration of battery cells under a dynamic-voltage allowing policy.

Alternatively, a dynamic-voltage-allowing policy is defined to support as many applications as required and to improve the maximum deliverable power, given available battery cells, at the expense of a voltage drop that corresponds to a single battery-cell voltage. Under the dynamic-voltage-allowing policy, one or more healthy battery cells in a series chain may be singled out as shown in FIG. 3. To apply this policy, $n_p$ remains fixed in accordance with the application requirements and $n_s$ is then calculated by $$\left\lfloor \frac{f_N(\Psi)}{n_p} \right\rfloor,$$

resulting in $(f_N(\Psi)-n_s \cdot n_p)$ healthy battery cells to be bypassed. As with the constant-voltage-keeping policy, the battery cells are singled out based on their SOC. Likewise, this procedure repeats at periodic monitoring intervals ($\Delta t$) or upon initiation of a reconfiguration event.

These two policies may be further understood from the example, set forth below. Suppose three parallel groups, each of which has 4 battery cells in series, the configuration is represented as C1(O), C2(O), C3(O), C4(O)
C5(O), 06(O), C7(O), C8(O)
C9(O), 010(O), 011(O), C12(O)

where O indicates which of corresponding cells are being used. Suppose that the voltage of each cell equals 1V so that each series string outputs 4V. Assuming that C6 and C8 fail, two cells in the other groups should rest in order to balance voltages across the groups, resulting in this configuration:

C1(O), C2(O), C3(--), C4(--)
C5(O), C6(X), C7(O), C8(X)
C9(O), C10(O), C11(--), C12(--)

where X indicates the corresponding cells fail and -- indicates the cells rest.

The semantic bypassing mechanism will reconfigure battery connectivity in accordance with one of the two policies. If the constant-voltage keeping policy is applied (i.e., demand voltage is 4V), then the resulting configuration is C1(O), C2(O), C3(O), C4(O)
C5(O), C6(X), C7(O), C8(X), C9(O), C10(O)
C11(--), C12(--)

and the power output by this configuration is 4V*2 (=8P). On the other hand, if the dynamic-voltage allowing policy is applied, then the resulting configuration is C1(O), C2(O), C3(O),
C4(O), C5(O), C6(X), C7(O),
C8(X), C9(O), C10(O), C11(O), C12(--)

with the power output by this configuration being 3V*3 (=9P). In the dynamic-voltage allowing policy, the number of parallel groups ($n_p$) is not changed. Instead, by adjusting output voltage with ns, the deliverable power may be increased.

These two policies are complementary to maximize the battery usability. In particular, according to the load demand which is application-specific, the constant-voltage keeping policy is applied whenever it is necessary. For example, a system that supports dynamic-voltage scaling reduces down its system voltage when it has a low demand. To do this, the system often uses a step-down DC-DC converter. A DC-DC converter may consume energy in the course of conversion. In this case, instead of using the DC-DC converter, applying the constant-voltage keeping policy to the reconfigurable system allows more energy-savings. On the other hand, the dynamic voltage keeping policy is applied when multiple applications are to be accommodated simultaneously. Applications that require different voltage and power need a specific capacity, thereby defining in the number of parallel groups, $n_p$, needed and causing them to be fixed.

Once $n_s$ and $n_p$ are determined in accordance with the applied policy, the controller 50 applies a connectivity configuration algorithm to achieve the desired circuit arrangement. An exemplary configuration algorithm is set forth below.

```
Config (F, ns, np):
  f ← find(F ≠ 1, F=TB+PB);   /* Find cells available to use */
  k ← f[1];                   /* Select the first available cell */
  for i ← 1 : np
    Signal (S_{k,l}, On); /* Start a parallel-connected group */
    while Fk = 1           /* Check whether the k-th bit in F is 1 */
```

-continued

| | |
|---|---|
| Signal ($S_{k,B}$, On);<br>k ← k+1;<br>end while | /* Bypass cellk */ |
| Signal ($S_{k,S}$, On);<br>j ← 1;<br>while j < (ns − 1)<br>  k ← k+1;<br>  while Fk = 1<br>    Signal ($S_{k,B}$, On);<br>    k ← k+1;<br>  end while<br>  Signal ($S_{k,S}$, On);<br>  j ← j+1;<br>end while<br>Signal ($S_{k,P}$, On);<br>end for | /* Connect cells in series */<br><br><br><br><br>/* Bypass cellk */<br><br><br>/* Connect cells in series */<br><br><br>/* End a parallel-connected group */ |

The connectivity configuration algorithm begins by determining which cells in the system are available for use. When the k-th local control unit reports a cell failure to the controller, the controller updates its data structure, PB, to permanently bypass the faulty cell by setting PB(k) to 1, where PB is a bit-vector of size equal to the total number of battery cells and k is the k-th bit of the bit-vector. The occurrence of a cell failure requires a healthy cell in each parallel group to become inactive, i.e., temporarily bypassing it. This intentional bypass is tracked by the controller which maintains another data structure, TB, for temporary bypass, where TB is a bit-vector of size equal to that of PB.

Starting with the first available cell, a parallel-connected group is constructed by the algorithm. Each cell is evaluated sequentially. Healthy cells are connected in series; whereas, unhealthy or failed cells or healthy cells reflected by TB are bypassed. The procedure repeats until $n_s$ healthy cells are connected in series, thereby forming a parallel-connected group. The process moves to the next parallel-connected group and repeats the procedure until $n_p$ parallel-connected groups have been formed. It is envisioned that other procedures may be used to connect cells to achieve the desired circuit arrangement.

Unlike ideal cells, the output voltage of cells is not constant during their discharge. That is, ns×Va drops nonlinearly, deviating from Vd. The deviation can be handled by using a DC-DC converter. A DC-DC converter, however, dissipates energy in the form of generation of heat. The energy dissipation is gauged with conversion efficiency for the DC-DC converter ($EFF_{DC\text{-}DC}$) given by $EFF_{DC\text{-}DC}=(I_{OUT} \times V_{OUT})/(I_{IN} \times V_{IN})$, where $I_{IN}$ and $V_{IN}$ each are input current and voltage to the DC-DC converter, and $I_{OUT}$ and $V_{OUT}$ are output current and voltage from it, respectively. $EFF_{DC\text{-}DC}$ can be approximated to be between 75% and 95%, when the input variation is not extreme; DC-DC converters are most efficient when the input voltage is closest to the output voltage. It is important to find the right point in time for reconfiguration so as to minimize power dissipation. Define a function of power: $f_{DC\text{-}DC}: V_{IN} \times V_{OUT} \to EFF_{DC\text{-}DC}$. Then, power dissipation is given by $PD=(1-f_{DC\text{-}DC}(V_{IN}, V_{OUT})) \times V_{IN} \times I_{IN}$. Once $V_{IN}$ is determined, the constant-voltage keeping policy is applied.

To minimize power dissipation, adjust $V_{IN}$ to $V_d$ by reconfiguring the cell connectivity. Assuming the reconfiguration overhead is limited by the switching overhead, the switching overhead includes the power consumption of transmitting a signal to a switch and turning on/off the switch. This overhead in discrete-time seldom varies and is thus approximated to be constant, resulting in a negligible amount of power dissipation, compared to the energy dissipation in continuous time. The controller self-configures the cell arrangement whenever a priori power dissipation is greater than a posteriori power dissipation (after the reconfiguration) including the switching overhead, i.e., when satisfying the condition:

$$(1-f_{DC\text{-}DC}(Vc,Vd)) \times Pc\Delta tC > (1-f_{DC\text{-}DC}(V^*d,Vd)) \times P^*d \times \Delta t_C - \alpha \times P^*d$$

where Vc denotes a priori terminal voltage, and V*d is an approximation of the demand voltage, Vd; and α is a switching overhead. With V*d, the controller recalculates $n_s$ and $n_p$. This criterion allows the controller to self-reconfigure the cell connectivity in real time.

The architecture described above may be extended to multiple battery packs, where each battery pack is comprised of a reconfigurable battery system 10 as described above. In other words, each battery pack is comprised of a plurality of battery circuits and a local controller that controls the operation of the battery circuits. This extended architecture further includes a global controller in data communication with each of the local controllers to coordinate functions amongst the battery packs. Extension of the dynamic reconfiguration framework to multiple battery packs is represented as $\gamma=(E, F, S, \Psi)$, where $\Psi=\{\Psi_1, \ldots, \Psi_2, \ldots, \Psi_k\}$. γ is configured by the global controller in cooperation with the local controllers; whereas, each $\Psi_i$ is configured via its respective local controller. The two policies described above can be implemented in and applied by the global controller.

Global controller reconfigures the battery cells in γ in conjunction with local controllers, generating a wide range of supply voltages for the load. Given $V_d$, the global controller calculates the number of battery cells to be connected in series $\Psi_k$ and γ, i.e., $$n_s \cdot N_s \equiv \left\lceil \frac{V_d}{V_a} \right\rceil, \quad (5)$$

where $n_x \leq f_N(\Psi_k)$ is the number of battery cells in a series chain in $\Psi_k$ and $N_s \leq f_N(\gamma)$ is the number of battery cells in a series chain in γ. This equation holds on the condition that if $f_N(\Psi_k) \leq f_N(\gamma)$, then $n_s \leq N_s$ or if $f_N(\gamma) \leq f_N(\Psi_k)$, then $N_s \leq n_s$. After $n_s$ and $N_s$ are resolved subject to the condition, $n_p$ in $\Psi_k$ is calculated by $$\left\lfloor \frac{f_N(\Psi_k)}{n_s} \right\rfloor.$$

Likewise, $N_p$ (the number of series chains connected in parallel) in γ is calculated by $$\left\lfloor \frac{f_N(\gamma)}{N_s} \right\rfloor.$$

As a consequence, the local controllers and the global controller apply the connectivity configuration algorithm with arguments of ($\Psi$, $n_s$, $n_p$) and ($\gamma$, $N_s$, $N_o$), respectively, thereby resulting in all the battery cells in and out of the battery packs configured in tandem.

When a plurality of battery packs are arranged in parallel, it may be necessary to bypass one of the battery packs if the battery pack includes failed battery cells. Similar to the local controller, the global controller determines as failure when ($F_i$, On) is detected. However, when $\Psi_i$ is simply bypassed, some battery cells in $\Psi_i$ may become unusable. To address this issue, the global controller performs a pack-level bypassing decision algorithm. In this algorithm, the global controller finds the minimum number of available cells across packs, denoted as $n_m$, and then calculates how many cells will be bypassed in each pack, based on previous values of $n_m$. This decision is systematically made by the global controller via a decision function set forth below:

```
Y = {f_N(Ψ_1),...,f_N(Ψ_k)}; B=0;
Battery-Pack Bypassing Decision (Y, B):
    n_m ← min (Y);       /* the smallest number of cells across packs */
    n_pb ← |{ Ψ_i | n_m=f_N(Ψ_k)}|   /* the number of packs that
    have n_m */
    n_b ← Σ (Y- n_m );   /* sum of cells that may be bypassed */
    if n_b ≧ (n_m × n_pb + B)
        Battery-Pack Bypassing Decision
        (Y - { Ψ_i | for all k, n_m=f_N(Ψ_k)}, n_m× n_pb);
    else
        return n_m;
end if
```

Two examples are provided below to better understand this decision function. In a first example, suppose that there are 4 battery packs each of which initially has 6 cells. That is, [6, 6, 6, 6]. When 1, 2, and 2 cells have failed in packs 1, 2, and 3, respectively, (denoted by [5, 4, 4, 6]), we get $n_m=4$. Since the number of cells to be bypassed in each pack (denoted as $n_b$), i.e., the sum of (1, 0, 0, and 2) is smaller than $n_m \times 2$, the algorithm does not bypass packs 2 and 3. Instead, it decides to bypass 2 cells in pack 1 and 1 cell in pack 4. In an second example, assume [4, 2, 3, 6]. In this example, $n_m=2$. Since $n_b=7$ (i.e., 2+0+1+4) is greater than $n_m$, pack 2 is bypassed, resulting in [4, 3, 6]. In this step, $n_m=3$. Since $n_b=4$ (i.e., 1+3) is smaller than $n_m+n_m$*(the previous $n_m$), the algorithm returns $n_m$ (i.e., the latest $n_m$). Each pack then bypasses its cells based on $n_m$. That is, 1, 2, 0, and 3 cells are bypassed in packs 1, 2, 3, and 4, respectively. In this way, the global controller can determine when and how to bypass a battery pack. When the local controller in each pack receives the latest value of $n_m$ from the global controller, each local controller applies the constant-voltage keeping policy based on $n_m$.

The reconfigurable framework described above can also be used to support multiple applications, where an application requires power from the battery system. For example, in a vehicle, the starter motor, the windshield wipers and the radio may all require power from the battery system. Each application defines an output voltage requirement $V_d$ and may be assigned a priority. The output voltage requirement $V_d$ for an application k determines the number of cells in series $N_{s,k}$ needed to meet the requirement. The sum of $N_{p,1}$, $N_{p,2}$, . . . , $N_{p,k}$, gives the total number of healthy battery cells. $N(\gamma)$ leads to q parallel groups for all the applications.

Battery cells can then be allocated to each of the requesting applications. If the number of battery cells needed to meet the application requirements exceeds the number of battery cells available for use, then the available battery cells are assigned to applications based on the priority assigned to the applications. If the number of battery cells available for use exceeds the number of cells needed to meet the application requirements, then the controller can allocate remaining cells. In either case, available battery cells are distributed first to high-priority applications, i.e., those with a high demand voltage. This distribution continues until the remaining cells are not enough to be distributed. An exemplary allocation policy is defined as follows.

Multi-Terminal-Based Grouping:

/* $\{N_{s,1}, \ldots, N_{s,i}, \ldots, N_{s,k} / N_{s,1} > \ldots > N_{s,i} > \ldots > \ldots N_{s,k}\}$ */
$[N_{p,1}, \ldots, N_{p,i}, \ldots N_{p,k}] \leftarrow 1$ $q \leftarrow \left\lfloor \dfrac{N(\gamma)}{N_{s,1} + \ldots N_{s,i} + \ldots N_{s,k}} \right\rfloor$;

for j←0;

if $\left(fN(\gamma) - q\sum_{i=1}^{k} N_{s,i}\right) < \sum_{I=1}^{J} N_{p,i} \cdot N_{s,i}$ $N_{p,j} \leftarrow 0$;

end if
end for
$[N_{p,1}, \ldots, N_{p,i}, \ldots N_{p,k}] \leftarrow [N_{p,1}, \ldots, N_{p,i}, \ldots N_{p,k}]$+q;
return $[N_{p,1}, \ldots, N_{p,i}, \ldots N_{p,k}]$ Thus, the controller allocates the power source of $N_s \times N_{p,k}$ to each application k. In the case of the extended reconfigurable framework, the allocation policy is implemented by the global controller.

Once the battery cells have been allocated, the controller(s) configure the battery system accordingly. The battery system is first configured to provide an input terminal and an output terminal for each application having allocated battery cells. To do so, input-terminal switches 46a-46n and output-terminal switches 48a-48n are controlled to provide multiple terminals. For instance, when input-terminal switches ($S_{i,T}$, On) and output-terminal switches ($S_{i,P}$, On) stay for all battery circuits 30a-30n, the interface for the battery pack has a single input terminal and a single output terminal. Conversely, to segment the battery circuits 30a-30n and provide multiple terminals, select input-terminal switches and output-terminal switches can be set to Off. For each application segment, the battery system is then configured to meet the application requirements using the semantic-bypassing mechanism described above.

Large-scale battery cells, e.g., for EVs and HEVs, are packed in such a way that $n_s$ battery cells are connected in series, providing the required supply voltage, and $n_p$ parallel groups are connected in parallel, determining flows of the current (I), resulting in the required capacity. The capacity, because of the nonlinearities of batteries, cannot be derived simply by the ideal battery capacity equation:

$$C = T \cdot 1, \tag{6}$$

where T is the discharge time (the battery lifetime). Instead, empirical Peukert's relation models nonlinearities for the case of a constant current load by introducing an empirical parameter as: $C = T \cdot I^\alpha$, where $\alpha > 1$ is called Peukert's value, which typically ranges between 1.2 and 1.4.

For purposes of the reconfigurable battery management system, the nonlinearity may be modeled using discretization of a flow of the current. That is, real-world systems are characterized by loads that are variable over time. Such variable loads may be approximated by piece-wise constant loads, represented by a set of M current levels $(i_1, \ldots, i_M)$, in which M is used to characterize the load and is determined by the quantization interval, $\Delta t(\equiv t_i-t_{i+1})$ which is a fraction of the total operation time, T. That is $$I_i(t) \equiv \sum_{i=1}^{M} i_i \cdot 1_{[t_{i-1},t_i]}(t),$$

where $1_A(t)$ is an indicator function. So, the smaller the $\Delta t$, the higher the accuracy in the characterization of the load. In the case where $\Delta t \equiv T$, the load is constant. The patterns of the load can be obtained via empirical measurements, resulting in a discharge profile for a battery cell or a pack of battery cells. Thus, the model of Eq. (6) generalizes to $$C = T \cdot I_i(t). \quad (7)$$

The total load is the sum of the current that is loaded from individual parallel groups, i.e., $I=I_1+ \ldots +I_i+ \ldots +I_{n_p}$ and it is uniformly distributed at some point in time within a certain acceptable threshold in discrepancy, leading to $I=n_p \cdot 1_i$. This results in $$C = T \cdot \frac{I(t)}{n_p}. \quad (8)$$

When cell failures occur, the number of available parallel groups equals $n_p-N(t)$, where $N(t)$ is the total number of failures occurred in the battery-cell array by time t. In the ABS, the number of available parallel groups is defined as:

$$n_A \equiv n_p - \left\lceil \frac{N(t)}{n_s} \right\rceil, \ 0 \le N(t) \le n_p \cdot n_s \quad (9)$$

Since the numbers of these failures that occur in disjoint time intervals are independent, $N(t)$ is Poisson distributed with a battery-cell failure rate, $\lambda$. So, the average total number of cell failures that occur by time t is proportional to t, resulting in $\lambda \cdot t$. This equation is applied to Eq. (9) yielding:

$$C = T \cdot \frac{I(t)}{n_A} \equiv T \cdot \frac{I(t)}{n_p - \left\lceil \frac{\lambda \cdot t}{n_s} \right\rceil}, \quad (10)$$

where $$t < \frac{n_p \cdot n_s}{\lambda} \le T.$$

On the other hand, in a legacy scheme, the load for a series chain of operational battery cells increases in proportion to the total number of cell failures across the $n_p$ parallel groups as:

$$n_L = \begin{cases} n_p - N(t), & 0 < N(t), < n_p \\ 0, & n_p < N(t) \le n_p \cdot n_s \end{cases} \quad (11)$$

The linear increase in the load is due to the fact that it fails to reuse any healthy battery cells in the series chain containing a faulty cell. So, the available capacity in following the legacy scheme is calculated by $$C \equiv T \cdot \frac{I(t)}{n_L} \equiv T \cdot \frac{I(t)}{n_p - \lambda \cdot t}, \quad (12)$$

where $$t < \frac{n_p}{\lambda} \le T.$$

Therefore, the higher $\lambda$, the more lifetime gain over the legacy scheme; it is also inversely proportional to the number of battery cells in series, $n_s$.

Either of the two policies described above is applied, based on the configuration of the battery-cell connectivity. To maximize battery-cell utilization the capacity of power that the entire battery cells deliver is selected as a criterion to compare the two policies. If an m×n matrix represents a combination of $n_s$ battery cells in a series chain and there are $n_p$ parallel groups, any element of battery cells in the matrix is assumed to become faulty independently of others. For instance, when one battery cell fails, $(n_s-1) \cdot n_p$ of power is provided, based on the dynamic-voltage allowing policy. For simplicity, it is assumed the element of each battery cell is capable of 1 volt and 1 ampere, while $n_s \cdot (n_p-1)$ of power based on the constant-voltage keeping policy. So, the breakeven point in selecting the policy is found when $n_s=n_p$. When more than one battery cell fails, the number of battery cells left unused due to the faulty-cell detouring reflects a measure of the capacity. In other words, a ratio (r) of the number of columns (c) to the number of rows (w) counted on faulty cells in the matrix can be a factor in the decision to make, comparing with the total size of the matrix. So, the breakeven point is determined by $$r \equiv \frac{c}{w} \equiv \frac{n_p}{n_s}, \quad (13)$$

and hence, when $$r > \frac{n_p}{n_s},$$

the dynamic-voltage allowing policy is chosen, providing more capacity of power than the constant-voltage keeping policy.

An evaluation methodology is first described and then the performance of the described architecture is evaluated in comparison with a legacy scheme that cannot configure the battery-cell connectivity online. The metrics used for evaluation of battery performance include the battery lifetime and the supply voltage. The lifetime is proportional to the total capacity of the battery cells/packs, while the supply voltage determines the deliverable power. The battery dynamics were simulated using Dualfoil, which is widely used for designing multiple battery systems. For a more detailed explanation of Dualfoil, reference is made to "Modeling of galvanostatic charge and discharge of the lithium/polymer/insertion cell" *J. of Power Sources*, 140(6):1526-1533, 2003. Using Dualfoil is sufficient to demonstrate the way the battery connectivity is dynamically reconfigured.

Figure 4:
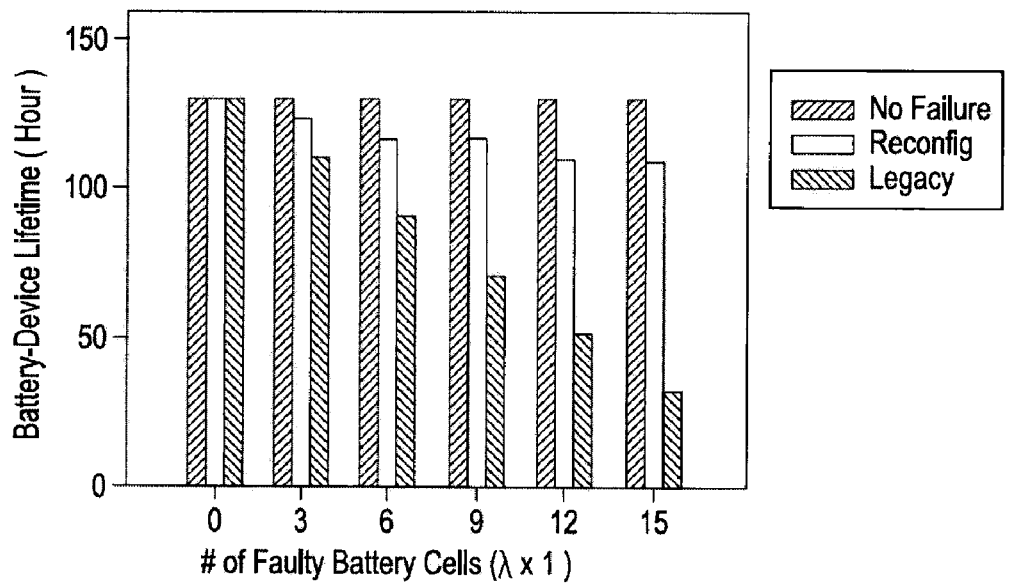
FIG. 4 is a graph illustrating the difference between a reconfiguration scheme and a legacy scheme as it relates to the lifetime of a battery.
Figure 5:
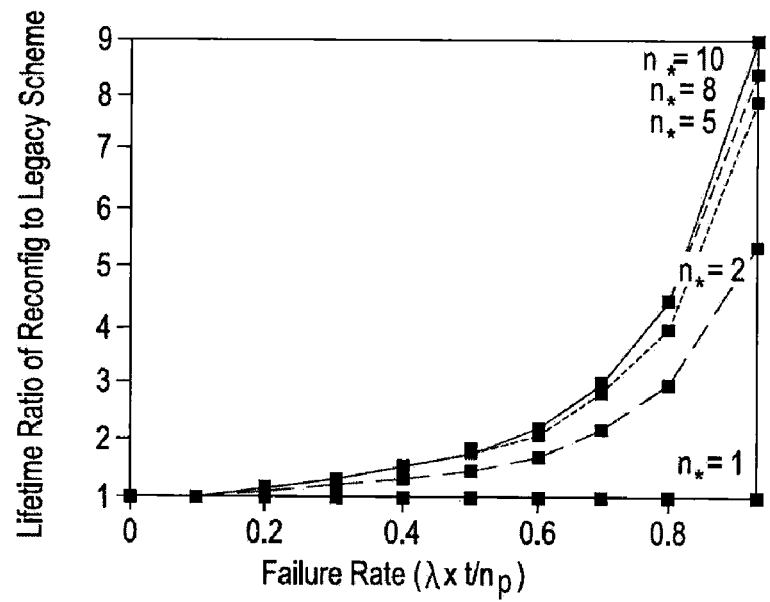
FIG. 5 is a graph illustrating battery lifetime gain achieved by reconfiguration as a function of the number of battery cells in a series chain.

The reconfiguration framework effectively "masks" the effects of a battery-cell failure, thus extending the battery lifetime, while the legacy scheme significantly suffers battery-capacity loss and hence reduces the lifetime. The battery lifetime is computed with the maximum deliverable power and the amount of current constantly drawn from the battery pack. Obviously, the more the battery-cell failures, the higher the reduction in the battery lifetime. FIG. 4 illustrates the results of the comparison of the battery lifetimes. Clearly, the legacy scheme loses a significant amount of span as the number of faulty battery cells increases. The reason for this is that the failure of one battery cell results in the loss of the series chain including the faulty battery cell. By contrast, the reconfiguration framework reuses the remaining healthy battery cells in the series chain as backup cells. So, despite additional battery-cell failure in other chains, they are replaced with surviving healthy battery cells. FIG. 4 shows the fault-tolerance capability of the proposed reconfiguration framework. For instance, when $\lambda \cdot t \equiv 6$ through 9 and $\lambda \cdot t \equiv 12$ through 15, the battery-pack's lifetime remains constant irrespective of an increase in number of battery-cell failures. The difference in lifetime between the two mechanisms gets larger as the frequency of battery-cell failures gets higher. As can be seen in FIG. 5, the lifetime gain achieved by the reconfiguration framework grows substantially with an increase in number of battery cells in a series chain ($n_s$) in each parallel group, thus enhancing the availability of backup battery cells. This is effective even for the case of connecting two battery cells in series (i.e., $n_s=2$), achieving a factor of 5 gain. Clearly, the more the battery cells in series, the larger the gain.

Figure 6:
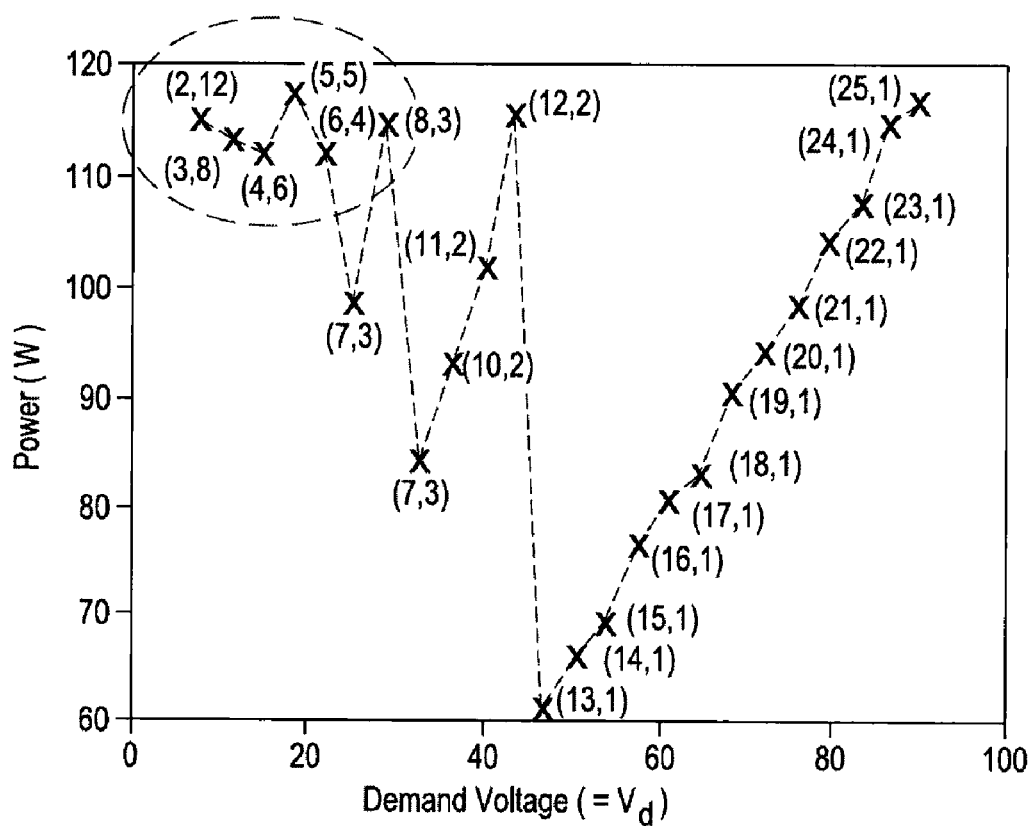
FIG. 6 is a graph illustrating changes in demand voltage and presentation of the corresponding power.

The dynamic-voltage-allowing policy aims to meet the demand of wide-ranging supply voltages from different applications while keeping deliverable power maximum. FIG. 6 illustrates changes in the demand voltage and the corresponding maximum deliverable power resulting from a 25-battery-cell pack that is based on the configuration of setting actual supply voltage and capacity of each battery cell to 3.6 Volts and 1.3 AH, respectively, with jitter of 2.5% allowed. So, maximum deliverable power is bounded by between an estimated 114 W and 120 W. This power can be delivered in a combination of 5 parallel groups and 5 battery cells of a series chain in each group (i.e., (5, 5)), or one parallel group with 25 battery cells in series (i.e., 25, 1)). Interestingly, a good range of supply voltages, corresponding to the group circled in FIG. 6, is provided while keeping maximum deliverable power reasonably constant. This implies that appropriately turning the battery connection can improve the utilization of battery cells while meeting the demand of the underlying applications. In the meantime, the connectivity of (9, 2) or (13, 1) appears inefficient with respect to the utilization of battery cells. However, failure of any battery cell or a voltage drop can be resolved by virtually replacing them with backup battery cells, thereby maintaining the required voltage level.

Figure 7:
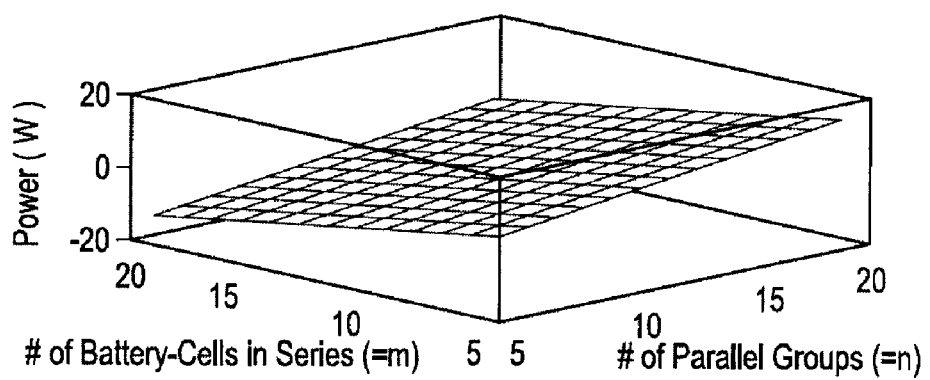
FIG. 7 is a graph showing a comparison of dynamic voltage allowing and constant voltage keeping policies with maximum deliverable power.

The dynamic-voltage-allowing and constant-voltage-keeping policies are devised for different purposes: the former aims to meet the demand of wide-ranging supply voltages, while the latter is to sustain an acceptable range of supply voltage against battery failures or a possible voltage drop during the battery lifetime, both with the deliverable power kept maximum. So the two policies can be compared with respect to the deliverable power. FIG. 7 shows the distribution of power magnitudes between the constant-voltage-keeping and the dynamic-voltage-allowing policies. In battery connectivity, when $n_s > n_p$, the dynamic-voltage-allowing policy is effective in supplying the maximum deliverable power, while when $n_p > n_s$, the constant-voltage-keeping policy is a better choice. The reason for this lies in the utilization of unused battery cells/packs. Obviously, the break-even point occurs when $n_s = n_p$.

Figure 8A:
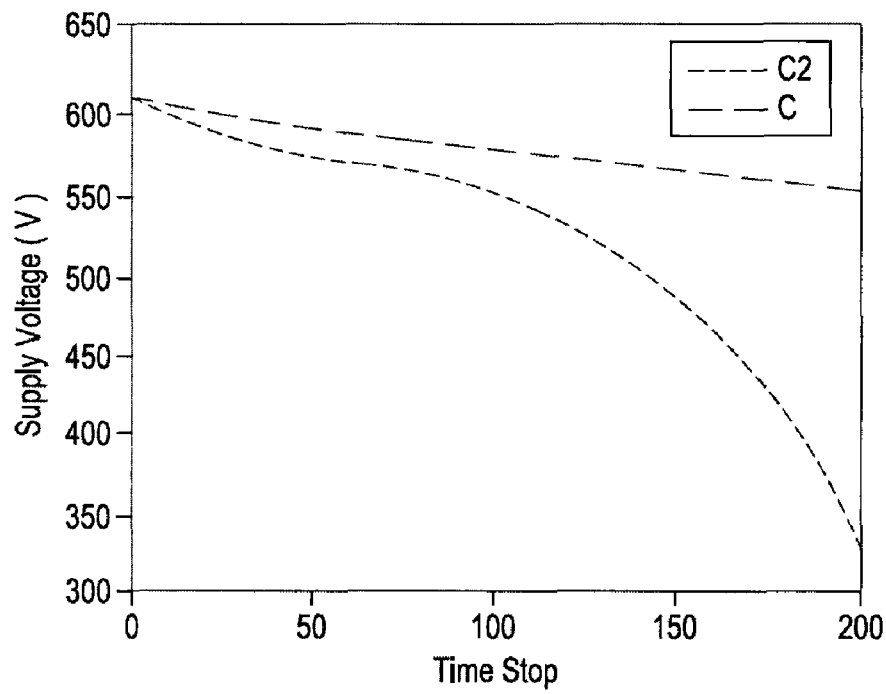
FIGS. 8A-8D are graphs depicting dynamic reconfiguration subject to a voltage demand with respect to different discharge rates.
Figure 8B:
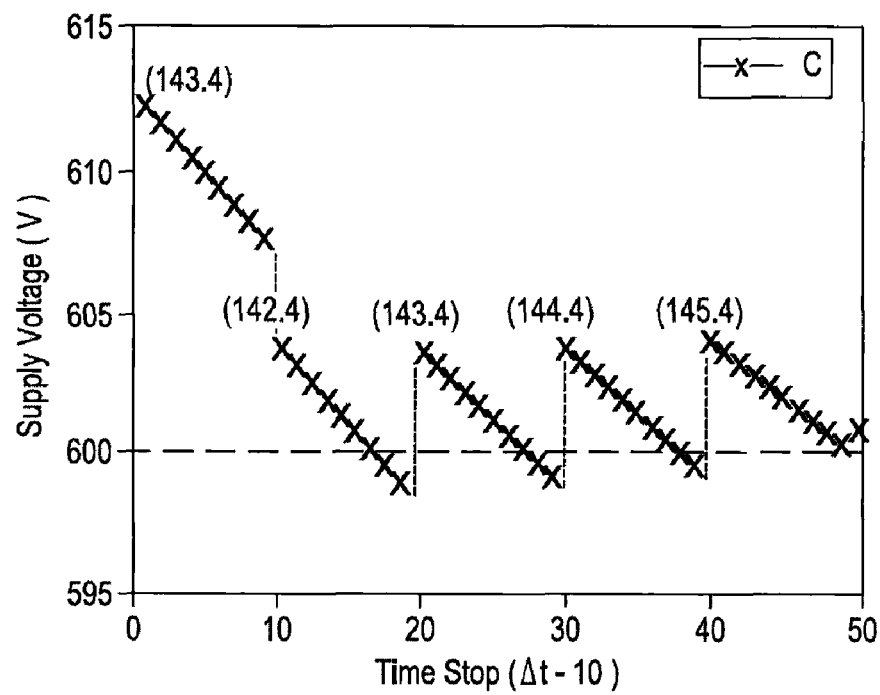
Figure 8C:
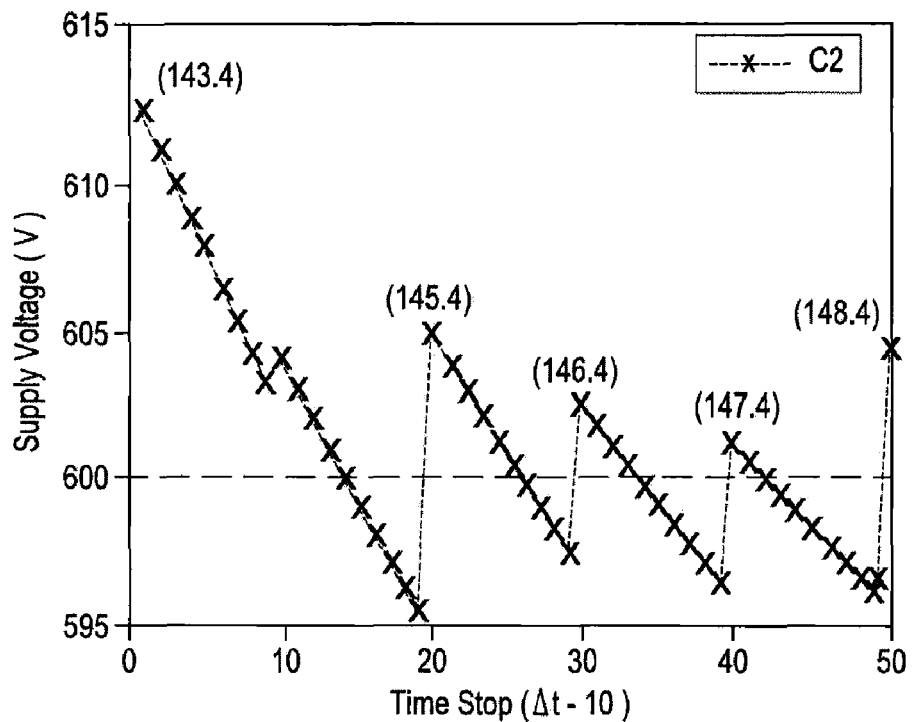
Figure 8D:
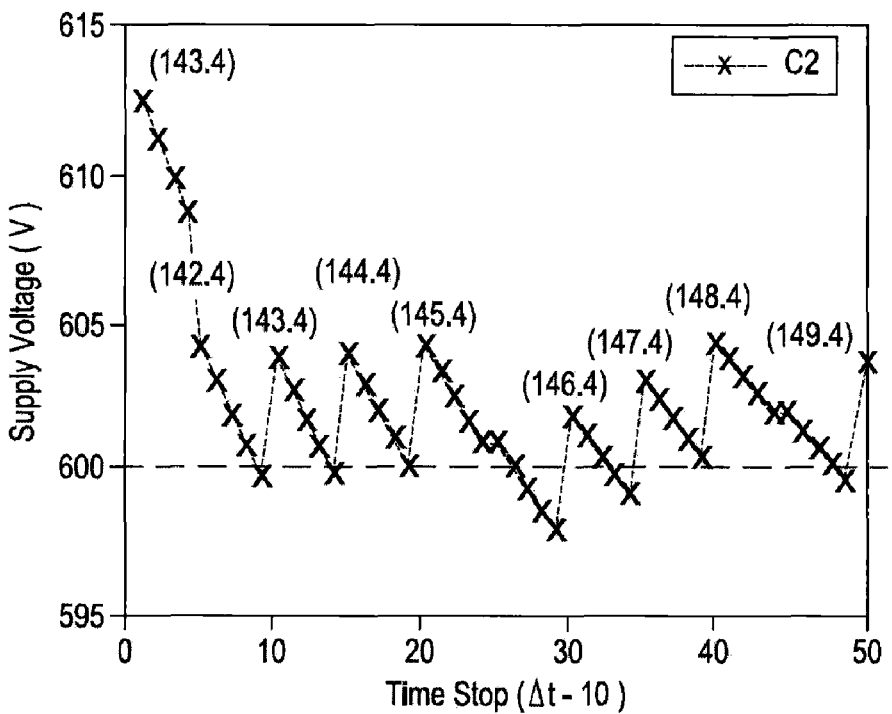

As mentioned earlier, since the voltage drop is unavoidable, the constant-voltage-keeping policy is applied to keep the supply voltage above or equal to the demand voltage while the supply voltage is being monitored. The monitoring interval ($\Delta t$) is directly associated with a degree to which the system may suffer due to the voltage drop below the demand. The higher the frequency of monitoring, the shorter the time an application suffers, but the higher the overhead of monitoring. FIG. 8A shows changes in supply voltage with two different discharge rates during the lifetime of a 700-battery-cell pack. It is assumed that each battery cell is discharged independently, following the distribution of discharging a Lithium-ion battery that is simulated with the configuration of providing output voltage of 4.3 volts and nominal capacity of 1.3 AH. Demand voltage ($V_d$) for an application is assumed to be 600 volts. In the case where the battery pack is discharged at C rate, in FIG. 8B, when the battery pack is monitored every $\Delta t$ (=10), it is detected at the $10^{-th}$ time interval when the supply voltage drops below $V_d$, reconfiguring the battery pack connectivity into 4 parallel groups with 143 battery cells in a series chain, i.e., (143, 4), providing an estimated 604 volts. In the case of C2 rate, in FIG. 8C, the underlying application suffers 5 times more battery-capacity loss than at the normal discharge rate. In particular, the more steeply does the supply voltage drop, the larger the difference between the supply and demand voltages. This case can be improved by reducing the monitoring interval ($\Delta t=10$). As can be seen in FIG. 8D, with the monitoring interval halved ($\Delta t=5$), on-time detection of the voltage drop is improved by 67%.

Figure 9:
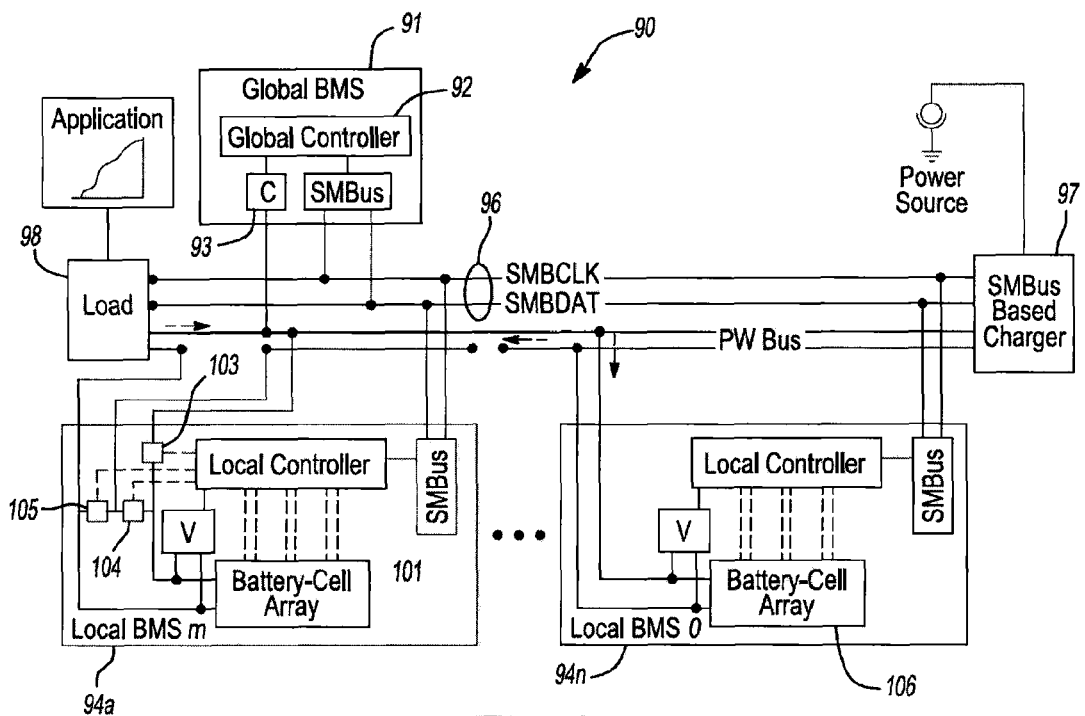
FIG. 9 is a diagram of another exemplary reconfigurable battery system.

Another exemplary reconfigurable battery system 90 is described in relation to FIG. 9. The battery system 90 is comprised generally of a global battery management system (BMS) 91 and multiple local BMSs 94a-94m. The global BMS 91 is formed by a global controller 92 and a current meter 93. Each local BMS 94a-94m is formed by a local controller 101, a voltage sensor 102, a set of array-level switches 103, 104, 105 and a battery-cell array 106 having one or more battery cells. Each local controller 101 monitors the battery condition, e.g., voltage, temperature, state-of-charge (SoC) and state-of-health (SoH), of cells in the corresponding battery-cell array 106 as well as manages the operation of the corresponding battery-cell array.

The global BMS 91 and the local BMSs 94a-94m are interconnected by a data bus 96. The data bus 96 consists of data and clock lines via which the global controller 92 and the local controllers 101 communicate with each other. A battery charger 97 and/or load 98 for the battery system may also be connected to the data bus 96. In an exemplary embodiment, the data bus 96 is implemented in accordance with a Systems Management Bus (SMBus) protocol. Thus, messages are exchanged through the data line SMBDAT. A message may include address, command type, control, and data bits. The clock line SMBCLK is used to indicate the beginning and the end of a communication in coordination with the messages sent over the data line SMBDAT. That is, a high-to-low transition on SMBDAT with SMBCLK high indicates a start condition, and a low-to-high transition on SMBDAT with SMBCLK high indicates a stop condition. Besides, it includes other functions, such as clock synchronization and arbitration of contention for SMBDAT. Further details regarding the SMBus protocol may be found in the System Management Bus Specification ver. 2.0, Technical Report, SBM Implementer Forum, 2000. While reference has been made to SMBus protocol, it is understood that the data bus may be implemented in accordance with other types of communication protocols (e.g., Controller Area Network (CAN) protocol).

Figure 10:
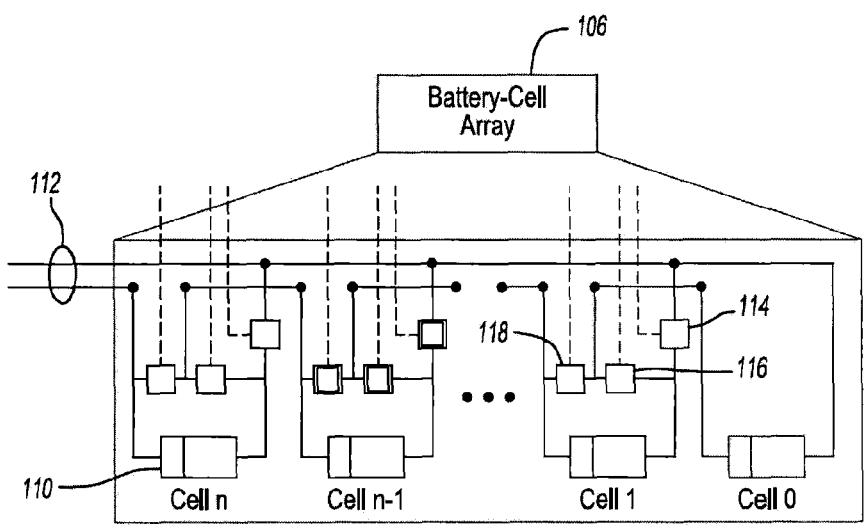
FIG. 10 is a diagram depicting the construct of battery-cell array residing in the battery system.

The construct of a battery-cell array 106 is further described in relation to FIG. 10. The battery-cell array 106 is comprised of a plurality of battery circuits 108 adjoined to each other and coupled via two connections 112 to the load 98. Each battery circuit 108 includes a battery cell 110 having an input terminal and an output terminal. A battery-cell array 106 is designed by making the tradeoff between the cost and the reconfigurability, both of which increase monotonically with the number of switches used. By reconfigurability, we mean the capability of bypassing any battery cell, enabling effective voltage-balancing via selective discharge or charge of cells and extending the pack's operation-time even in the event of random cell failures. The number of switches needed is determined based on connection requirements.

FIG. 10 illustrates a preferred arrangement for the switches in the battery-cell array 106. Specifically, a first switch 114 (also referred to below as P-switch) is connected between the load and an input terminal of the battery cell; a second switch 116 (also referred to below as S-switch) is connected between an input terminal of the battery cell and an output terminal of a battery cell in an immediately adjacent battery circuit; and a third switch 118 (also referred to below as B-switch) is connected between the output terminal of the battery cell and the output terminal of the battery cell in the adjacent battery circuit. The local controller is operably coupled to all of the switches in the battery-cell array and selectively controls operation thereof.

This switch arrangement supports two types of reconfigurability. First, all cells in an array can be connected in series or in parallel. When they are connected in parallel (series), the array's capacity (terminal voltage) will be a cell's capacity (voltage)×the number of cells. Second, any individual cell can be charged separately, which is important for cell-balancing.

To place the cells in series, the second switch is placed in a closed position, while the first and third switches are placed in an open position. In a series arrangement, some weak (short-circuited) cell may have little effect on the array's current except that the overall terminal voltage may drop by no more than the weak cell's voltage. Some weak (open-circuited) cell, however, can block the current flow, making the series-chain of battery cells unusable. To bypass the weak cell, the second and third switches are set to a closed position, while the first switch is set to an open position, thereby bypassing the weak battery cell.

The cells can be connected in parallel with each other. To place the cells in parallel, the second switch is placed in an open position, while the first and third switches are placed in the closed position. In the parallel arrangement, a single short-circuited cell makes the other cells unusable. In this case, the first and second switches are set to an open position, while the third switch is set to a closed position, thereby bypassing the battery cell. Consequently, three switches per cell are sufficient for any cell to be bypassed in both parallel and series arrangements. It is noted that the array-level switches are arranged and can be configured in the same manner as the cell-level switches.

For switch failures, the stuck-at fault model is adopted in which a faulty switch stays at either ON or OFF state permanently, irrespective of inputs to the switch. Local and global controllers are capable of detecting these switch failures in a timely manner. Based on this fault model, the reliability of the entire battery pack will be analyzed below.

Reliable, robust switches are essential to withstand high volt-ages and currents. Three switch modes exist: on, off, and transition. In the on mode, a switch is conductive and must have a low impedance, e.g., in the order of milli ohms (also referred to as a closed position). The lower the impedance, the lower the power dissipation, and hence, the lower the radiative heat. In the off mode, a switch is resistive and blocks high currents (also referred to as an open position). High voltages can create a damaging electric arc, particularly at mechanical contacts. In the transition mode, a switch transits from on to off mode, or vice versa. A high voltage that can generate an electric arc, may destroy the switch circuit. Considering the above switch characteristics, one must select proper switches. Two types of switch can meet our need: semi-conductor and electromechanical relay switches. In the on mode, a switch's impedance is a key selection criterion. MOSFETs or IGBTs have relatively low impedance, so that they may be appropriate for high current applications. For instance, in MOSFETs, given the impedance of 5 milli ohms, a high current of 100 Amperes creates 50 Watts of power dissipation ($P=I^2 \times R$). By contrast, electromechanical relays are known to have a two orders-of-magnitude lower contact resistance than semiconductor switches, decreasing power dissipation to 0.5 Watt. In the off or transition mode, electromechanical relays can be weakened or even destroyed by arcs due to high voltages, while such an effect does not exist in semiconductor switches. To suppress such arcs, one may use additional hardware components that rely on magnetic fields. Other types of switches are also contemplated by this disclosure. It is, therefore, important to analyze current loads to be imposed on the switches.

A large range of time-varying currents requires fine-grained metering; a larger range leads to higher metering capability. A higher sampling rate yields higher the accuracy in measurements, but incurs higher cost; high output values at a high sample rate requires a high-performance processor/global controller. In general, a linear Hall sensor integrated with digital signal processing, such as TLE4998 linear Hall sensor commercially available from Infineon, is widely used for highly-accurate measurements.

Current sensing is performed primarily by the global BMS and used for the estimation of battery SoC. In the array-level parallel arrangement, the global controller measures the current from the entire battery pack (FIG. 9), and then estimates the current of each local BMS by dividing the measured current by the number of arrays, assuming that all arrays are approximately identical with respect to their voltage and resistance values. When the discrepancy of these values exceeds a specified threshold, the estimate is no longer valid. In such a case, individual local BMSs should be able to measure them; the local controller measures the current from its battery cells in the same way as the global controller does at the array level. Obviously, there is a tradeoff between increase in accuracy and reduction in cost and workload. The measurement frequency is another design parameter for weighing the accuracy against the computation overhead.

Each local BMS may conducts thermal sensing. The main heat sources are battery cells, switches, and controllers. In particular, battery cells generate the most heat of all. Also, the battery capacity varies with ambient temperatures. Battery (e.g., lithium-ion) cells may not operate correctly as their temperature approaches −58 F, whereas they may explode if they approach 167E Since the battery's operating temperature ranges very widely, we need to use a temperature sensor with accuracy on the order of ±35 F which is not expensive. Digital temperature sensors, such as thermistors, thermocouples, and resistive temperature detectors, can meet our need. We also need a heat sink to which the dissipated heat is transferred. There are three basic modes of heat transfer—in a solid, in a fluid flow, and through a vacuum but the choice of heat sink is design-specific.

The global and local BMSs have monarchy-based relationships. The global controller determines an array-level arrangement via a systematic switch configuration algorithm presented below. The local controllers execute command codes listed in Table 1 corresponding to the arrangement directed by the global controller.

TABLE 1

Command type and code

| | | Type | | |
|---|---|---|---|---|
| NULL | INIT | BYPASS | PARALLEL | SERIES |
| Code 000 | 100 | 001 | 101 | 010 |

The local controllers are also able to determine their cell-level arrangement autonomously and which cell to be bypassed. In the monarchy-based structure, each local controller is responsible for monitoring its cells and responding to the global controller's interrogation. The monarchy-based structure is scalable to a large-scale battery pack by sharing with local controllers various tasks related to arranging, monitoring, and scheduling battery cells and arrays.

Alternatively, the relationship between the global and local controllers can be viewed as fully-centralized, as the global controller determines both cell- and array-level arrangements. In the fully centralized structure, a local controller's role is minimum and hence unneeded; the global controller may directly monitor individual battery cells, bypass some cells, and perform load-balancing for discharge, cell-balancing for charge, or voltage-balancing for both. In this sense, the fully-centralized structure is agile in detecting and preventing an anomaly caused by some cells. This structure, however, can quickly be overwhelmed by a large number of battery cells to manage. The more the cells, the longer the time to monitor them. Therefore, the monarchy-based structure may become better than the fully-centralized beyond a certain number of battery cells.

In an exemplary embodiment, command codes are 3-digits long. The first digit indicates the state of the first switch, and the second and the last digits indicate states of the second and third switches, respectively. The value of 0 (1) means that the corresponding switches are turned off (on). These codes are designed to control switches at both the array-level and cell-level.

At the array-level configuration, the global controller issues an appropriate command in Table 1 to individual local controllers. A sequence of commands are issued systematically based on the systematic switch configuration algorithm shown below. The local controllers then execute the dispatched command to control the array-level switches. At the cell-level configuration, on the other hand, the local controller executes a sequence of commands on individual cells independently.

Each command has its own purpose. First, the NULL code is applied to keep a specific battery cell (array) open, disconnecting all the battery cells (arrays) behind the cell. For instance, setting Cell 2 to the NULL code means that Cells 0 and 1 are not in use, irrespective of the configuration of their switches. This bypass can be an option for the case that any switches around Cells 0 and 1 are dysfunctional. Second, the INIT code indicates the beginning of the battery-cell array (a chain of arrays). Thus, the INIT code is applied to the battery cell (array) next to the one to which the NULL code has been applied. Third, the BYPASS code is applied to bypass any battery cell (array) except for the first, i.e., Cell 0 (local BMS 0). Since the first cell (local BMS 0) does not have its own switches, the INIT code is applied to the next cell, bypassing the first. Next, the PARALLEL code is applied to make a parallel arrangement. Likewise, the SERIES code is applied to make a series arrangement.

The global BMS periodically aggregates the information on battery conditions (including voltage, temperature, and current) that individual local BMSs monitor cells within their battery-cell array. The local controller measures a terminal voltage between the two terminals of the battery-cell array. On the other hand, to measure the voltage of individual cells, e.g., Cell i, the local controller applies the INIT code to Cell i, and the BYPASS code to Cell i+1 to n. In case of Cell 0, it applies the BYPASS code to all cells. The global controller then fetches the voltage measurement from the local controller during the aggregation period. The local controller also measures the temperature of its battery-cell array. When the temperature exceeds a certain threshold, the local controller disconnects the cell from the load by issuing the NULL code to Cell n. Unlike the voltage measurement, the local controller reports this anamoly to the global controller whenever it occurs. For the current measurement, it is delegated to the global BMS, since it is costly.

The global BMS is responsible for the array-level arrangement, while the local BMS is for the cell-level arrangement. According to the switch configuration algorithm shown below, the parallel arrangement is changed to the series arrangement or vice versa. First, the global (local) controller takes as an input a bit-array of connectivity, barr, where 1 and 0 of the i-th bit indicates the connection and bypassing of the i-th array (cell), respectively. Then, it searches for the first available array (cell) and applies the INIT command to the array-level (cell-level) switches. Thereafter, when arrays (cells) are to be connected in parallel or in series, the PAR-ALLEL or the SE-RIES code is applied to individual arrays (cells), respectively. Thus, the arrays (cells) are connected as specified.

Set switches:

Input: barr(n+1): bit-array of battery connectivity;
Input: ctype: {parallel, series};
Output: tarr(n): type-array of switch configuration;
i ← 1;
  while barr(i)<1 /*search the first available unit*/
    i ← i+1;
  switch barr (i)
    case 0: /*disconnect the unit from the load*/
      tarr (i−1) ←null
    case 1: /*connect the unit to the load*/
      tarr (i−1) ←init;
      break;
  i ← i+1;
    while i ≤ n+1 / *connect the rest of the units*/
      switch barr (i)
      case 0: /*bypass the unit*/
        tarr (i−1) ← bypass;
      case 1: /*connect the unit in series or in parallel */
        tarr (i−1) ← ctype;
    i ← i+1;

During the course of battery activities (i.e., charge, discharge, and rest), some arrays (cells) may be bypassed. In this case, the global (local) controller determines which arrays (cells) to be bypassed by setting barr, and then runs the algorithm with barr. The local BMSs that have the arrays bypassed may be put into sleep mode where the monitoring halts to save power. The local BMSs in the sleep mode go back to the operation mode upon the global controller's request. The rest period depends on a discharge rate; the lower the discharge rate, the longer the rest period.

The local controllers running the switch configuration algorithm can effectively perform voltage-balancing based on the scheduling mechanism. Also, the local controller can autonomously decide to make its battery-cell array open-circuited by applying the NULL command to the array-level switches. This is an exceptional case: the array is overheated, overcharged, or deep-discharged.

The application requests, from the global BMS, the battery's remaining operation-time, the time for the battery to fully be charged, and the battery's lifetime—in particular, accurate prediction of the lifetime is of great importance to the battery's lifetime warranty. First, for the battery's operation-time, the global BMS feeds the aggregated voltage and current into a reference model. This reference model includes functions of time-dependent charge and discharge rates. An exemplary reference model is described in "Scheduling of Battery Charge, Discharge, and Rest." by Hahnsang Kim and Kang G. Shin, *Real-time Systems Symposium*, pages 13-22, Washington, D.C., USA, December 2009 IEEE Computer Society which is incorporated by reference herein. Applying the reference model results in the remaining operation-time. Second, as in the calculation of the battery's operation-time, the time for the battery to be fully charged is also obtained from the reference model with the current charge rate. Third, the battery's lifetime is assessed based on the internal impedance of the battery cells, since a high impedance dissipates high power, generating heat. This will ultimately lower the supply voltage and its effect will propagate to other battery cells. Such irreversible degradation will shorten the battery's lifetime. To assess the lifetime, we measure the battery's terminal voltage, computing the battery's internal impedance, such that $$V = \frac{R}{R+r} V_0,$$

where $V_0$ is the reference voltage, and $R$ and $r$ are the load and the internal impedance. Note that various methods are available for this purpose.

As mentioned earlier, given constant resistance inside a switch, power dissipation on switches exponentially increases as the current passing through it increases. Thus, the current imposed on switches is essential to assess. The current loads on array-level switches are differentiated in the parallel and series arrangements. For simplicity, assume that all arrays are identical. Parameter used are defined as follows:

xC: coulombs (per second) required by the load;
p: probability of a local BMS being bypassed;
r≦N: number of local BMSs connected to the load for charge or discharge among N arrays in total;
k≦r: number of local BMSs consecutively connected among r BMSs;
i: number of local BMSs among k that precede the (k+1)th local BMS.

In the parallel arrangement, the array-level P-switch in each local BMS (FIG. 1) is switched on over the course of battery charge or discharge. Since the current load is equally shared with r local BMSs, the P-switch is loaded with $$\frac{x}{r}C$$

with the probability of (1−p). The array-level S-switch is never switched on. While the array-level B-switch serves as the conductors. Thus, in a customized battery-cell array, the S-switch and B-switch can be removed and replaced with a wire. Otherwise, the current load on the B-switch proportionally increases as i increases, resulting in $$\frac{ix}{r}C$$

with the probability of (1−p).

In the series arrangement, the array-level S-switch in each local BMS is always switched on unless the local BMS thereof is by-passed. The current on each of these S-switches is the same, resulting in xC with the probability of (1−p). The array-level P-switch in a local BMS, on the other hand, is switched on only if all preceding local BMSs are bypassed. Thus, the current on the P-switch in the (k+1)th local BMS is equal to $p^k(1-p) \times C$. The array-level B-switch in a local BMS is switched on only if the local BMS is to be bypassed with the probability of p, resulting in p×C. Table 2 shows the current load on each array-level switch in the (k+1)th local BMS.

TABLE 2

Current on array-level switches in the (k + 1)th local BMS

| Arrangement | P-switch | S-switch | B-switch |
|---|---|---|---|
| Parallel | $(1-p)\frac{x}{r}C$ | 0C | $(1-p)\frac{ix}{r}C$ |
| Series | $p^k(1-p)xC$ | $(1-p)xC$ | pxC |

Like array-level switches, cell-level switches are loaded with the same pattern. At the cell level, however, the current fed into a battery-cell array varies with the array-level arrangement. In the array-level parallel arrangement, the current load on the array-level P-switch directly runs into an array, i.e., $$C^* = 1(1-p)\frac{x}{r}C,$$

whereas that on the array-level S-switch does, i.e., $$C^* = 1(1-p)\frac{x}{r}C$$

in the array-level series arrangement. Given $C^*$ and $C_+$, the current load on each cell-level switch is determined. Parameters used are defined as:

q: probability of a cell in the battery-cell array for charge or discharge among n cells in total;
s≦n: number of cells connected in a battery-cell array for charge or discharge among n cells in total;
l≦s: number of cells connected consecutively in a battery-cell array;
j: number of cells among/cells which precede the (l+1)th cell.

In the parallel arrangement, each cell-level P-switch within a battery-cell array is switched on over the course of battery charge or discharge. The current load is equally shared with s battery cells, resulting in $$\frac{1}{s}C^*(C^+)$$

in the array-level parallel (series) arrangement with the probability of (1−q). Cell-level S-switches, on the other hand, are never switched on, while cell-level B-switches serve as the conductors. Like corresponding array-level switches, they are removed or replaced with a wire. Otherwise, the current load on the cell-level B-switch proportionally increases as j increases, resulting in $$\frac{j}{s}C^*(C^+)$$

in the array-level parallel (series) arrangement with the probability of (1−q).

In the series arrangement, the cell-level S-switch in each cell is always switched on unless the corresponding cell is bypassed. The current on each of these S-switches is the same, resulting in $C^*/C^+$ with the probability of (1−q). The current loads on the array-level P-switches and B-switches are also obtained in the same way as in the array-level series arrangement. Table 3 shows the current load on each cell-level switch in the (l+1)th cell.

TABLE 3

Current on cell-level switches in the (l + 1)th local BMS C* and C+ are input currents determined by the array-level arrangement, i.e., array-level P-switches.

| Arrangement | P-switch | S-switch | B-switch |
|---|---|---|---|
| Parallel (Parallel) | $\frac{(i-q)}{s}C^*$ | 0C | $(1-q)\frac{j}{s}C^*$ |
| Parallel (Series) | $\frac{(1-q)}{s}C^+$ | 0C | $(1-q)\frac{j}{s}C^+$ |
| Series (Parallel) | $q^l(1-q)C^*$ | $(1-q)C^*$ | $qC^*$ |
| Series (Series) | $q^l(1-q)C^+$ | $(1-q)C^+$ | $qC^+$ |

To assess the cost-effectiveness of a battery pack, we define its total cost CT as the sum of manufacturing and service costs as:

$$C_T = C_M + C_S \quad (14)$$

where $C_M$ and $C_S$ are the manufacturing and the service costs, respectively. $C_M$ denotes closely related to the imperfect testing process, whereas $C_S$ depends on the reliability of a battery pack within its warranty period. To assess reliability, we use a simple battery fault model: a battery cell fails when it becomes open-circuited (denoted as $F_B=0$) or short-circuited (denoted as $F_B=1$). Similarly, in the stuck-at fault model, a switch fails when it is stuck-at ON (denoted as $F_{SW}=1$) or OFF state (denoted as $F_{SW}=0$), regardless of inputs. The cost model is further describe now.

Before shipping products to customers, it is important to test them, since their failure in the field incurrs significant expenses and influences the customer's satisfaction or the manufacturer's reputation. Suppose that N battery-cell arrays form a battery pack and the observed yield per pack is ya, then the manufacturing cost per pack can be modeled as:

$$C_M = \frac{N \cdot C_A}{y_a} \quad (15)$$

The yield is the probability that a battery pack passes the test. This probability depends upon the fault coverage F; when F=0, no fault occurs. Using a negative binomial yield model, this probability is expressed as:

$$y_a(F, \lambda_a, a) = \left(1 + \frac{F \cdot \lambda_a}{a}\right)^{-a}, \quad (16)$$

where $\lambda_a$ is the average number of defects per array and a represents the degree to which defects are clustered. When $\lambda_a=0$, the battery-cell array is defect-free. When a→0, defects are strongly clustered, while a→∞ corresponds to weak clustering.

A battery pack may fail before the warranty expires. Even when some battery-cell arrays in the pack fail, the pack can "operate" with spare arrays in the reconfigurable battery system 90 described above and a conventional BMS without any reconfigurable switch. A battery pack consists of N battery-cell arrays, each of which is composed of n battery cells. Assume that the battery pack can operate as long as at least M-out-of-n arrays function, and each array operates as long as at least m-out-of-n battery cells function. This assumption applies to both the reconfigurable battery system 90 and conventional BMSs. The failure of a battery pack will incur a service cost for its repair or replacement, which is typically over-priced. The service cost is then directly related to the pack's reliability and can be modeled as:

$$C_S = (1 - R_p(t)y_a)C_F \quad (17)$$

where $C_F$ is the service cost per pack, and $R_p(t)$ is the reliability (probability) that at least M battery arrays in the pack are still operational at time t. $R_p(t)$ depends on the reliability of individual arrays. Let $R_A(t)$ be the reliability that a battery-cell array operates at time t, subject to individual components i.e., battery cells and switches. Also, let $X_B(X_{SW})$ be an exponentially-distributed random variable for a battery cell (switch) with rate $\lambda_B(\lambda^*_{SW})$. Then, $P\{X_B>t\}=e^{-\lambda_B t}$ and $e^{-\lambda^*_{sw} t}$. For simplicity of analysis, all battery cells (switches) are assumed identical.

Since $R_p(t)$ varies with the underlying fault model and battery arrangement, it is calculated with respect to each failure mode such that $(F_B, F_{SW})=\{(x, y)|x,y\in\{0,1\}\}$ and array-level parallel and series arrangements, resulting in 8 combinations. Each combination is divided into two parts, i.e., cell-level parallel and series arrangements. To indicate these configurations, we use notation CN.xy where N denotes a configuration, and x and y the array-level and the cell-level arrangements, respectively. Table 4 below lists all the configurations with fault instances.

The reliability of a battery pack with the reconfigurable battery system 90 is compared with that the conventional BMS. In the parallel arrangement, a short-circuited battery cell (i.e., $F_B=1$) creates a domino effect, causing the failure of the entire battery pack to be dysfunctional. This effect is fatal to the conventional BMS. Thus, the system reliability in the conventional BMS is subject to that of individual battery cells, resulting in C1.p for the array-level and C1.pp for the cell-level in Table 4. By contrast, the reconfigurable battery system 90 effectively deters the total failure via switch setting, in which P-switches play a critical role. In case switches get stuck-at ON state (i.e., $F_{SW}=1$), even if a battery cell (array) fails, the entire array (pack) still operates as long as the P-switch functions and at least m-out-of-n cells (M-out-of-N arrays) function; only when both the battery cell (array) and the corresponding P-switch fail, the array (pack) fails, resulting in the reliability of C1.pp for the cell-level (that of C2.p for the array-level). In case switches get stuck-at OFF state (i.e., $F_{SW}=0$), these switches can lower the reliability of battery cells (arrays). Thus, the minimum of a battery cell's (array's) lifetime and the corresponding P-switch's lifetime determines the reliability of the array (pack), resulting in that of C3.p for the cell-level (that of C3.pp for the array-level). On the other hand, an open-circuited battery cell (i.e., $F_b=0$) seldom affects the operation of the entire array except its output voltage drops no less than that of the cell itself. Thus, the array (pack) operates as long as at least m-out-of-n cells (M-out-of N arrays) operate, resulting in the reliability of C5.p for the cell-level (C5.pp for the array-level).

In the series arrangement, on the other hand, a short-circuited battery cell has the same effect as an open-circuited cell in the parallel arrangement on the reliability of the array (see C2.s and C2.ss). An open-circuited battery cell is critical since it can cause the entire array (pack) to be dysfunctional in the conventional BMS. This effect is the same as a short-circuited cell in the parallel arrangement. Reconfigurable battery system 90 bypasses the open-circuited cell by turning on the corresponding B-switch and off the S-switch. In case switches get stuck-at ON state, the B-switch is critical to reliability. In such a case, the cell (array) becomes open-circuited and the entire array's (pack's) voltage drops slightly. This reliability is the same as C1.ps (also C2.ss, C3ps, C4.ss, C1.ps, C6.ss, C1.ps, and C8.ss in Table 4), and C2.s for the cell-level (C4.s, C6.s, and C8.s for the array-level). When they get stuck-at OFF state, the S-switch becomes critical, resulting in the same reliability as in the case of B-switches. The reliability of every configuration is presented in Table 4.

TABLE 4 comparison of reliability of DESA and the conventional BMS

| Conf.($F_B$, $F_{SW}$) | Reliability of DESA |
|---|---|
| C1.p(1,1) | $R_P(t) = 1 - \left\{ \sum_{i=1}^{n} \binom{n}{i} (P\{X_{SW} \leq t\}(1 - R_A(t)))^i (1 - P\{X_{SW} \leq t\}(1 - R_A(t)))^{n-i} + \sum_{i=m+1}^{n} \binom{n}{i} (P\{X_{SW} > t\}(1 - R_A(t)))^i (1 - P\{X_{SW} > t\}(1 - R_A(t)))^{n-i} \right\}$ |
| C1.pp(1,1) | $R_A(t) = 1 - \left\{ \sum_{i=1}^{n} \binom{n}{i} (P\{X_{SW} \leq t\}P\{X_B \leq t\})^i (1 - P\{X_{SW} \leq t\}P\{X_B \leq t\})^{n-i} + \sum_{i=m+1}^{n} \binom{n}{i} (P\{X_{SW} > t\}P\{X_B \leq t\})^i (1 - P\{X_{SW} > t\}P\{X_B \leq t\})^{n-i} \right\}$ |
| C1.ps(1,1) | $R_A(t) = \sum_{i=m}^{n} \binom{n}{i} P\{\min(X_B, X_{S_C}) > t\}^i (1 - P\{\min(X_B, X_{S_C}) > t\})^{n-i}$ |
| C2.s(1,1) | $R_P(t) = \sum_{i=M}^{N} \binom{N}{i} (R_A(t)P\{X_{S_A} > t\})^i (1 - R_A(t)P\{X_{S_A} > t\})^{N-i}$ |
| C2.sp(1,1) | C1.pp |
| C2.ss(1,1) | C1.ps |
| C3.p(1,0) | C2.s |
| C3.pp(1,0) | C1.ps |
| C3.ps(1,0) | C1.ps |
| C4.s(1,0) | C2.s |
| C4.sp(1,0) | C1.ps |

TABLE 4-continued

| | |
|---|---|
| C4.ss(1,0) | C1.ps |
| C5.p(0,1) | The same as conventional BMS's |
| C5.pp(0,1) | The same as conventional BMS's |
| C5.ps(0,1) | C1.ps |
| C6.s(0,1) | C2.s |
| C6.sp(0,1) | C5.pp |
| C6.ss.(0,1) | C1.ps |
| C7.p(0,0) | C2.s |
| C7.pp(0,0) | C1.ps |
| C7.ps(0,0) | C1.ps |
| C8.s(0,0) | C2.s |
| C8.sp (0,0) | C1.ps |
| C8.ss | C1.ps |

| Conf.($F_B$, $F_{SW}$) | $\lambda_{SW}*$ | Reliability of the conventional BMS |
|---|---|---|
| C1.p(1,1) | $\lambda_{SW} \frac{1}{\tau} \frac{(1-p)}{M} x$ | $R_p(t) = \Pi_{i=1}^{N} R_A(t)$ |
| C1.pp(1,1) | $\lambda_{SW} \frac{1}{\tau} \frac{(1-q)(1-p)}{mM} x$ | $R_A(t) = \Pi_{i=1}^{n} P\{X_s > t\}$ |
| C1.ps(1,1) | $\lambda_{SW} \frac{1}{\tau} q \frac{(1-p)}{M} x$ | $R_A(t) = \sum_{i=m}^{n} \binom{n}{i} P\{X_B > t\}^i (1 - P\{X_B > t\})^{n-i}$ |
| C2.s(1,1) | $\lambda_{SW} \frac{1}{\tau} p x$ | $R_P(t) = \sum_{i=M}^{N} \binom{N}{i} R_A(t)^i (1 - R_A(t))^{N-i}$ |
| C2,sp(1,1) | $\lambda_{SW} \frac{1}{\tau} \frac{(1-q)(1-p)}{m} x$ | C1.ps |
| C2.ss(1,1) | $\lambda_{SW} \frac{1}{\tau} q(1-p) x$ | C1.ps |
| C3.p(1,0) | $\lambda_{SW} \frac{1}{\tau} \frac{(1-p)}{M} x$ | C1.p |
| C3.pp(1,0) | $\lambda_{SW} \frac{1}{\tau} \frac{(1-q)(1-p)}{mM} x$ | C1.pp |
| C3.ps(1,0) | $\lambda_{SW} \frac{1}{\tau} \frac{(1-q)(1-p)}{M} x$ | C1.ps |
| C4.s(1,0) | $\lambda_{SW} \frac{1}{\tau}(1-p) x$ | C2.s |
| C4.sp(1,0) | $\lambda_{SW} \frac{1}{\tau} \frac{(1-q)(1-p)}{m} x$ | C1.pp |
| C4.ss(1,0) | $\lambda_{SW} \frac{1}{\tau}(1-q)(1-p) x$ | C1.ps |
| C5.p(0,1) | — | C2.s |
| C5.pp(0,1) | — | C.1ps |
| C5.ps(0,1) | $\lambda_{SW} \frac{1}{\tau} \frac{q(1-p)}{M} x$ | C1.pp |
| C6.s(0,1) | $\lambda_{SW} \frac{1}{\tau} p x$ | C1.p |
| C6.sp(0,1) | — | C1.ps |
| C6.ss.(0,1) | $\lambda_{SW} \frac{1}{\tau} q(1-p) x$ | C1.pp |
| C7.p(0,0) | $\lambda_{SW} \frac{1}{\tau} \frac{(1-p)}{M} x$ | C2.s |

TABLE 4-continued

| | | |
|---|---|---|
| C7.pp(0,0) | $\lambda_{SW}\frac{1}{\tau}\frac{(1-q)(1-p)}{mM}x$ | Cl.ps |
| C7.ps(0,0) | $\lambda_{SW}\frac{1}{\tau}\frac{(1-q)(1-p)}{M}x$ | Cl.pp |
| C8.s(0,0) | $\lambda_{SW}\frac{1}{\tau}(1-p)x$ | Cl.p |
| C8.sp(0,0) | $\lambda_{SW}\frac{1}{\tau}\frac{(1-q)(1-p)}{m}x$ | Cl.ps |
| C8.ss | $\lambda_{SW}\frac{1}{\tau}(1-q)(1-p)x$ | Cl.pp |

Since a switch's life varies with the current load imposed on it, the mean lifetime of each switch ($\lambda^*_{SW}$) is determined using fractions of the charge current load shown in Tables 2 and 3 with a normalization factor $\tau$ and an exponential random variable $\lambda_{SW}$ defined. The mean life for the main switch used in each configuration is also listed in Table 4.

To evaluate the dependability and scalability of the reconfigurable battery system 90, metrics are used that include the power dissipation on switches, the reliability of the entire battery system, and the service cost associated with failures. Parameters presented above are listed and specified in Table 5.

TABLE 5

Parameters and values

| Parameter | Description | Value |
|---|---|---|
| F | Fault coverage | 0.05 |
| $\lambda_a$ | Average # of defects | 3 |
| $\alpha$ | Clustering | 2 |
| $C_A$ | Manfg. Cost per array (normalized) | 1 |
| N | # of arrays | [20, 40] |
| M | Min. # of available arrays | [10, 20] |
| $C_F$ | Service cost per array | [15, 20] |
| n | . # of available cells per array | [15, 20] |
| m | Min. # of available cells per array | [15, 20] |
| $1/\lambda_B$ | Battery-cell lifetime (years) | 23 |
| $1/\lambda_S$ | 3-Ampere switch lifetime (years) | $1.5/\lambda_B$ |
| p | Prob. Of bypassing an array | 0.05 |
| q | Prob. Of bypassing a cell | 0.05 |
| r | # of arrays connected to load | [7, 10] |
| s | # of cells connected to load | [15, 20] |
| x | Current Ampere (coulombs) | [1, 10] |
| $\tau$ | Normalization factor | $2(C^* + C^+)$ |

In what follows, using the above metrics and parameters, the superiority of reconfigurable battery system 90 is demonstrated in relation superiority to a conventional BMS without reconfigurability.

Figure 11:
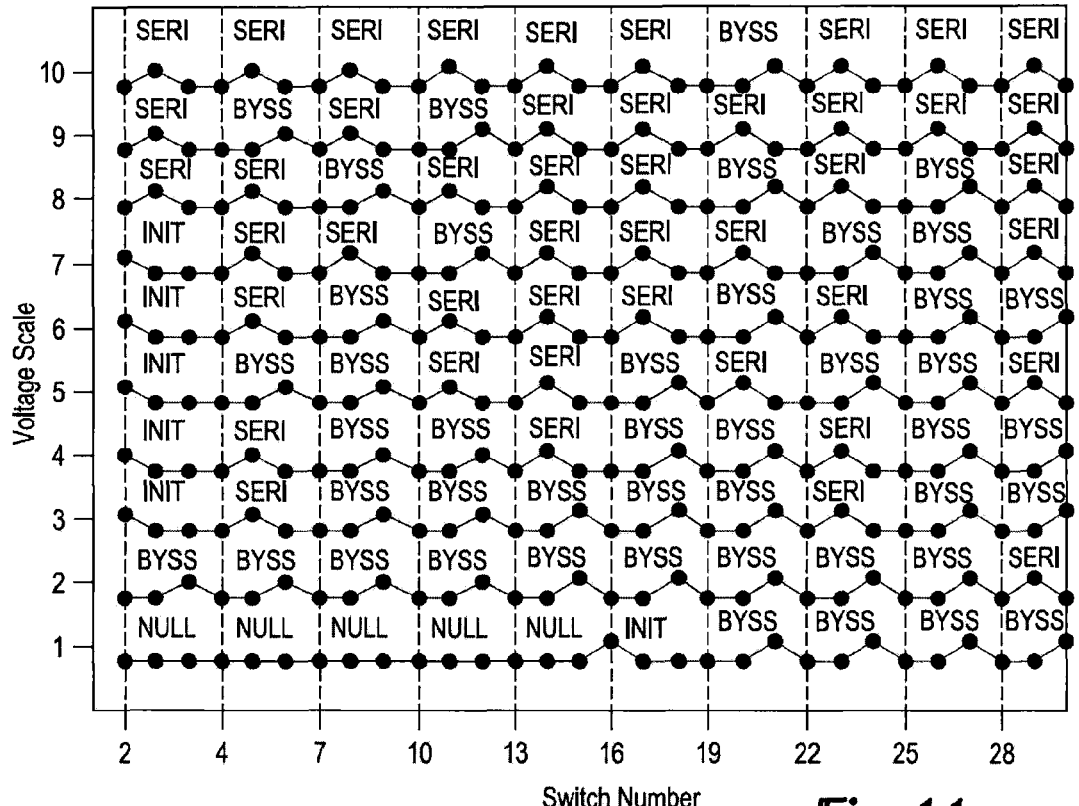
FIG. 11 is a chart showing the correspondence between a sequence of command codes ad the combination of switches.

Five command codes are defined to turn on/off switches. In the cell-level arrangement, the local (global) controller first determines which battery-cells (arrays) are to be turned on. After this determination with the barn parameter set, the local (global) controller applies the switch configuration algorithm, forming a combination of on- and off-switches. FIG. 11 shows the correspondence between a sequence of command codes and the combination of switches. Without loss of generality, we assume that every battery-cell's (array's) voltage is 1V For instance, when setting the total voltage to 1, the local controller turns on Switch 16, resulting in Cell 6 (i.e., the 7-th cell) to be active. Cells before (after) Cell 6 become open (bypassed).

In case of a 2V array, Cells 0 and 10 are connected in series. In general, the INIT code indicates the beginning of an active battery cell array. That is, the preceding battery cells are ignored in spite of their connectivity. Cell bypassing is applied effectively when the switches associated with the preceding battery cells are dysfunctional. This feature minimizes the impact of failure of a single battery cell or switch that might otherwise cause the entire battery cell array to fail.

Figure 12:
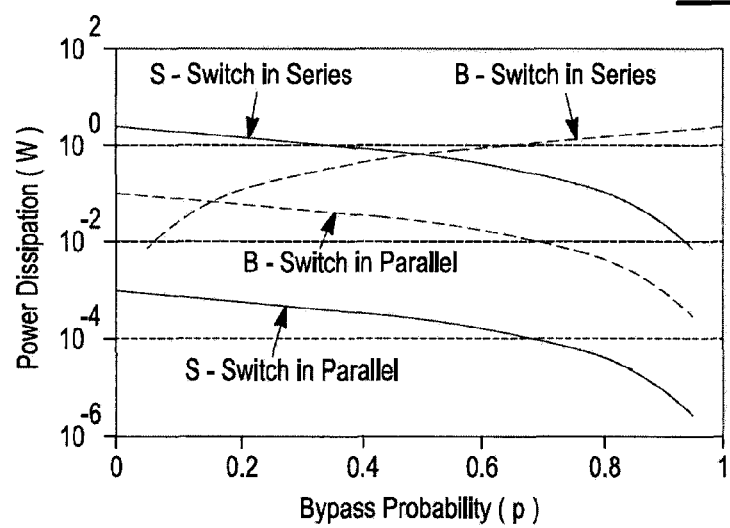
FIG. 12 is a graph illustrating power dissipation of the switches configured in series and parallel arrangements.

Three types of switch are used in reconfigurable battery system 90: P-, S-, and B-switches. Each switch incurs power dissipation because of their unavoidable internal resistance. Their power dissipation differs in parallel or series arrangement. In the series arrangement, the S-switch is turned on. As shown in FIG. 12, it consumes significant power. In contrast, to bypass a battery cell, its B- and S-switches are turned on and off, respectively. Thus, the likelihood of bypassing a battery cell dictates the power dissipation on the switches; a higher bypass probability results in lower power dissipation on the corresponding S-switch and higher power dissipation on the corresponding B-switch. In the parallel arrangement, the P-switch is turned on. The power dissipation thereon, however, is negligible in comparison with the S-switch in the series arrangement, since the current to the load is shared across the battery cells. By contrast, the B-switch in parallel serves as the conductor for the parallel-connected battery-cells. Its power dissipation, thus, depends solely on the distributed current. In general, it is on the two orders of magnitude higher than that on the P-switch. Note that S-switch is never turned on in the parallel arrangement.

Figure 13A:
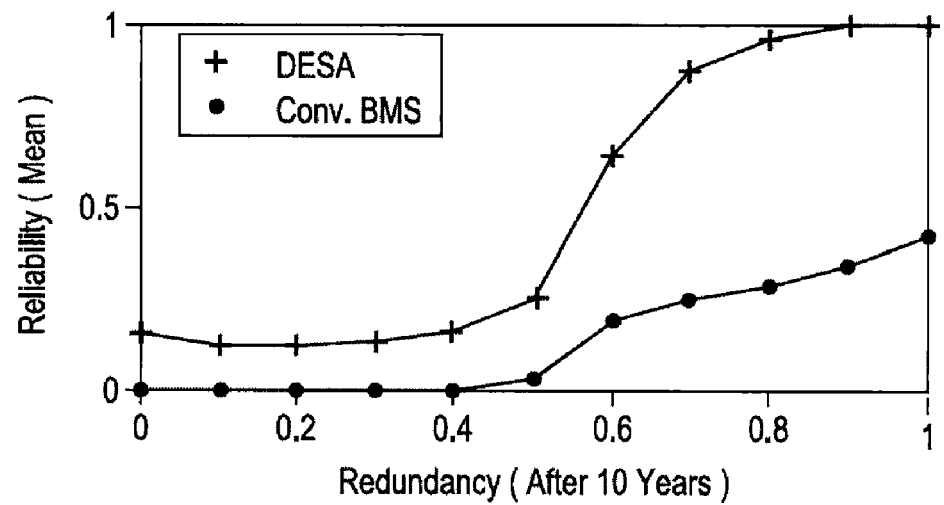
FIGS. 13A and 13B are graphs illustrating the reliability of the reconfigurable battery system in relation to conventional battery management systems.
Figure 13B:
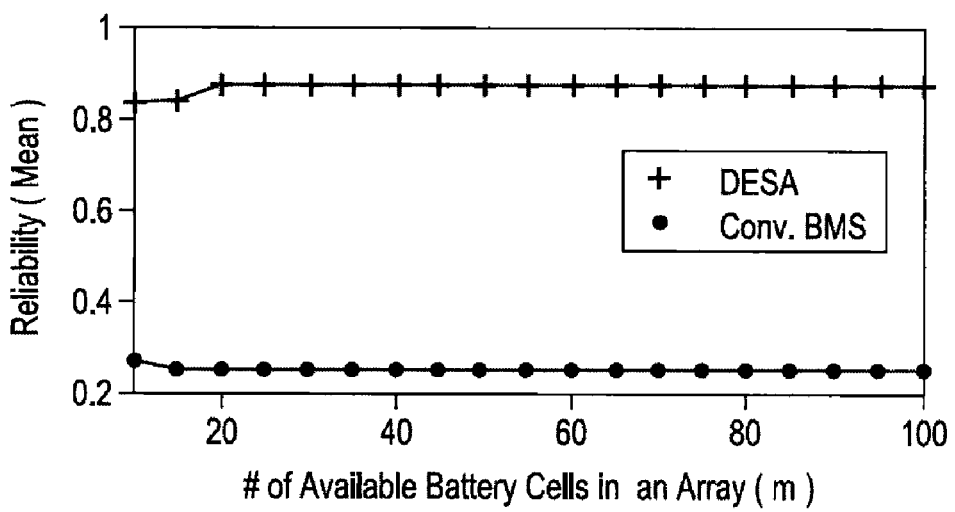

The battery pack operates as long as at least M-out-of-N battery-cell arrays function. Likewise, the array operates as long as at least m-out-of-n cells function. In other words, (n−m)M+(N−M)n battery cells can be used as backups. The more the back-up cells available, the longer the battery pack will last. Reconfigurable battery system 90 is more effective than the conventional BMS in utilizing redundant battery cells. As shown in FIG. 13A, the reconfigurable battery system 90 improves the pack's reliability an average of 2.7× more than the conventional BMS. Moreover, the reconfigurable battery system 90 can effectively handle a large number of battery cells. As shown in FIG. 13B, the reconfigurable battery system 90 improves the reliability by 3.5× with a 10-fold increase in the number of available battery cells in an array (m), compared to the conventional BMS, which cannot deal with a large number of battery cells.

Figure 14A:
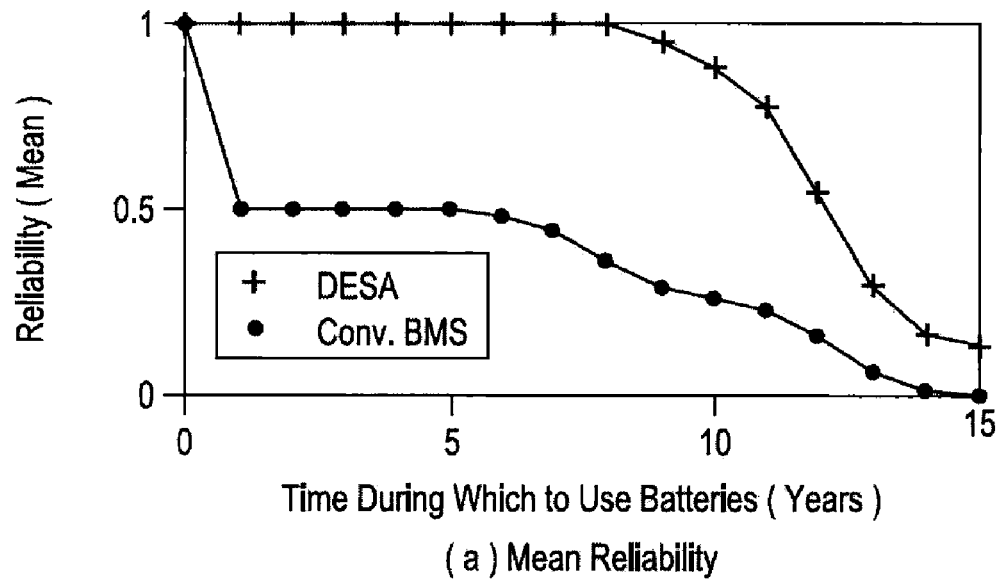
FIGS. 14A and 14B are graphs illustrating the reliability of the reconfigurable battery system in relation to conventional battery management systems when used at different redundancy rate.
Figure 14B:
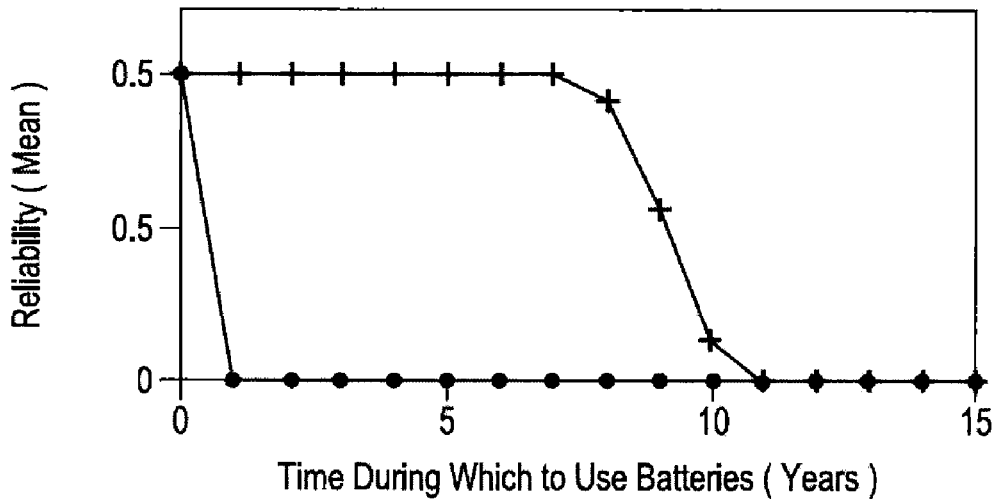

Although individual battery cells, on average, last long, e.g., 23 years, the lifetime of the battery pack formed by these cells is not guaranteed to last that long. Actually, it is subject to the arrangement of cells and their (random) failures. For instance, when the battery cells are connected in parallel, a short-circuited cell causes the entire battery pack to be unusable. In the case of series arrangement, an open-circuited cell has the same consequence. Reconfigurable battery system 90 effectively prevents the entire pack from failing due to such a single cell failure. As shown in FIG. 14A, on average, the reconfigurable battery system 90 offers twice as much reliability as the conventional BMS over the battery's lifetime. In particular, a battery pack managed by the reconfigurable battery system 90 for 10 years is 3× more reliable than the conventional BMS-managed one, whose reliability is only 26%. In the worst-case scenarios such as those mentioned earlier, as shown in FIG. 14B, the reconfigurable battery system 90 is by order of magnitude more reliable than the conventional BMS, which is susceptible to the failure of the entire pack caused by the failure of even a single battery cell. Thus, the reconfigurable battery system 90 offers robust battery management regardless of the type of failures that might occur.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A reconfigurable battery system, comprising:
   a plurality of battery circuits coupled via two connections to a load and arranged adjacent to each other to form a battery-cell array, where a given battery circuit in the plurality of battery circuits includes:
   a battery cell with an input terminal and an output terminal;
   a first switch connected between the load and an input terminal of the battery cell;
   a second switch is connected between an input terminal of the battery cell and an output terminal of a battery cell in an immediately adjacent battery circuit; and
   a third switch connected between the output terminal of the battery cell and the output terminal of the battery cell in the adjacent battery circuit; and
   a local controller operably coupled to the first switch, the second switch and the third switch in each of the plurality of battery circuits and selectively controls the first switch, the second switch and the third switch in the plurality of battery circuits;
   a first array-level switch connected between the load and an input node for the battery-cell array;
   a second array-level switch connected between the input node of the battery-cell array and an output node of an adjacent battery-cell array; and
   a third array-level switch connected between the output node of the battery-cell array and the output node of the adjacent battery-cell array.

2. The reconfigurable battery system of claim 1 wherein the second switch being in a closed position, and the first and third switches being in an open position, thereby placing the battery cell in series with battery cells in adjacent battery circuits.

3. The reconfigurable battery system of claim 1 wherein the second and third switches being is a closed position, and the first switch being in an open position, thereby bypassing the battery cell when the battery cell is in series with battery cells in adjacent battery circuits.

4. The reconfigurable battery system of claim 1 wherein the second switch being in an open position, and the first and third switches being in the closed position, thereby placing the battery cell in parallel with battery cells in adjacent battery circuits.

5. The reconfigurable battery system of claim 1 wherein the first and second switches being in an open position, and the third switch being in the closed position, thereby bypassing the battery cell when the battery cell is in parallel with battery cells in adjacent battery circuits.

6. The reconfigurable battery system of claim 1 further comprises a global controller operably coupled to the first, second and third array-level switches and selectively controls the first, second and third array-level switches.

7. The reconfigurable battery system of claim 6 where in the global controller controls the first, second and third array-level switches to bypass the battery-cell array.

8. The reconfigurable battery system of claim 6 further comprises a local controller associated with each of the battery-cell arrays, wherein the global controller is in data communication with the local controllers over a data bus in accordance with a Systems Management Bus protocol.

9. A reconfigurable battery system, comprising:
   a plurality of battery circuits coupled to a load and adjoined to each other to form a battery-cell array;
   a first array-level switch connected between the load and an input node for the battery-cell array;
   a second array-level switch connected between the input node of the battery-cell array and an output node of an adjacent battery-cell array; and
   a third array-level switch connected between the output node of the battery-cell array and the output node of the adjacent battery-cell array, where n battery circuit in the plurality of battery circuits includes:
   a battery cell with an input terminal and an output terminal, where the output terminal is connected to n+1 battery circuit;

a first switch coupled between the load and the input terminal of the battery cell;

a second switch coupled between the input terminal of the battery cell and an output terminal of a battery cell in n−1 battery circuit; and a third switch coupled between the output terminal of the battery cell and the output terminal of the battery cell in n−1 battery circuit.

10. The reconfigurable battery system of claim 9 further comprises a controller, operably coupled to the switches in n battery circuit, that closes the second switch and opens the first and third switches in the n battery circuit, thereby placing the battery cell in series with battery cells in adjacent battery circuits.

11. The reconfigurable battery system of claim 9 further comprises a controller, operably coupled to the switches in n battery circuit, that closes the second and third switches and opens the first switch in the n battery circuit, thereby bypassing the battery cell when the battery cell is in series with battery cells in adjacent battery circuits.

12. The reconfigurable battery system of claim 9 further comprises a controller, operably coupled to the switches in n battery circuit, that opens the second switch and closes the first and third switches in the n battery circuit, thereby placing the battery cell in parallel with battery cells in adjacent battery circuits.

13. The reconfigurable battery system of claim 9 further comprises a controller, operably coupled to the switches in n battery circuit, that opens the first and second switches, and closes the third switch, thereby bypassing the battery cell when the battery cell is in parallel with battery cells in adjacent battery circuits.

14. A reconfigurable battery system, comprising:

a plurality of battery cell arrays adjoined to each other, where each of the battery cell arrays defines an input node and an output node and includes a plurality of battery cells therein;

for a given battery cell array, a first array-level switch coupled between a load and the input node for the given battery-cell array, a second array-level switch coupled between the input node for the given battery-cell array and an output node of an adjoining battery-cell array, and a third array-level switch coupled between the output node of the given battery-cell array and the output node of the adjoining battery cell array; and a global controller that selectively controls the first, second and third array-level switches of the given battery cell array, wherein the given battery cell array further comprises a plurality of battery circuits arranged adjacent to each other, where a given battery circuit in the plurality of battery circuits includes:

a battery cell with an input terminal and an output terminal;

a first cell-level switch coupled between the input node of the battery cell array and an input terminal of the battery cell;

a second cell-level switch coupled between an input terminal of the battery cell and an output terminal of a battery cell in a battery circuit immediately adjacent thereto; and a third cell-level switch coupled between the output terminal of the battery cell and the output terminal of the battery cell in the adjacent battery circuit.

15. The reconfigurable battery system of claim 14 wherein the second array-level switch being in a closed position, and the first and third array-level switches being in an open position, thereby placing the given battery cell array in series with adjoining battery cell arrays.

16. The reconfigurable battery system of claim 14 wherein the second and third array-level switches being is a closed position, and the first array-level switch being in an open position, thereby bypassing the given battery cell array when the given battery cell array is in series with adjoining battery cell arrays.

17. The reconfigurable battery system of claim 14 wherein the second array-level switch being in an open position, and the first and third array-level switches being in the closed position, thereby placing the given battery cell array in parallel with adjoining battery cell arrays.

18. The reconfigurable battery system of claim 14 wherein the first and second array-level switches being in an open position, and the third array-level switch being in the closed position, thereby bypassing the given battery cell arrays when the given battery cell array is in parallel with adjoining battery cell arrays.

19. The reconfigurable battery system of claim 14 further comprises a local controller associated with the given battery cell array and operable selectively controls the switches in the given battery cell array.

* * * * *